US007620895B2

(12) United States Patent
Adkins et al.

(10) Patent No.: US 7,620,895 B2
(45) Date of Patent: Nov. 17, 2009

(54) SYSTEMS AND METHODS FOR TEACHING A PERSON TO INTERACT WITH A COMPUTER PROGRAM HAVING A GRAPHICAL USER INTERFACE

(75) Inventors: David L. Adkins, Pleasant Grove, UT (US); Mark R. Adkins, Orem, UT (US); Jeffrey W. Alton, Pleasant Grove, UT (US)

(73) Assignee: Transcensus, LLC, Orem, UT (US)

( * ) Notice: Subject to any disclaimer, the term of this patent is extended or adjusted under 35 U.S.C. 154(b) by 212 days.

(21) Appl. No.: 11/220,270

(22) Filed: Sep. 6, 2005

(65) Prior Publication Data

US 2006/0053372 A1    Mar. 9, 2006

Related U.S. Application Data

(60) Provisional application No. 60/608,360, filed on Sep. 8, 2004.

(51) Int. Cl.
*G06F 3/00* (2006.01)
(52) U.S. Cl. ................................ 715/709; 715/711
(58) Field of Classification Search ............... 715/709, 715/536, 711, 835, 829, 812, 708, 817, 823
See application file for complete search history.

(56) References Cited

U.S. PATENT DOCUMENTS

| | | | |
|---|---|---|---|
| 4,772,206 A | 9/1988 | Kerr et al. | |
| 5,428,731 A | 6/1995 | Powers, III | |
| 5,550,967 A | 8/1996 | Brewer et al. | |
| 5,581,684 A | 12/1996 | Dudzik et al. | |
| 5,596,698 A * | 1/1997 | Morgan | 715/863 |
| 5,825,355 A | 10/1998 | Palmer et al. | |
| 6,023,692 A | 2/2000 | Nichols | |
| 6,091,930 A | 7/2000 | Mortimer et al. | |
| RE37,723 E | 6/2002 | Goren | |

(Continued)

OTHER PUBLICATIONS

Rocket Software, Inc., Rocket.ActiveGuide, http://www.rocketsoftware.com/portfolio/activeguide/screenshots.htm, p. 1, Jun. 20, 2005.

(Continued)

*Primary Examiner*—Kieu Vu
*Assistant Examiner*—Omar Abdul-Ali
(74) *Attorney, Agent, or Firm*—Austin Rapp & Hardman

(57) ABSTRACT

Systems and methods are disclosed for teaching a person how to perform a task within a computer program with at least one graphical user interface object. A script is formulated that contains step-by-step instructions indicating to a person how to perform a task within a computer program through interacting with at least one graphical user interface object of the computer program. The script is formulated by reference to an entity map, which contains programming instructions for accessing at least one graphical user interface object of the program to perform a step of the task. The script is executed by displaying a partial graphical overlay on top of an actual, non-simulated graphical user interface of the program. Each graphical user overlay instructs a user how to provide pertinent user input to graphical user interface objects of the computer program. The partial graphical overlay is positioned adjacent to the pertinent graphical user interface object of the program regardless of the position of that object without any reprogramming of the underlying computer program.

23 Claims, 18 Drawing Sheets

U.S. PATENT DOCUMENTS

| | | |
|---|---|---|
| 6,427,063 B1 | 7/2002 | Cook et al. |
| 6,615,172 B1 | 9/2003 | Bennett et al. |
| 6,687,485 B2 | 2/2004 | Hopkins et al. |
| 6,692,256 B2 | 2/2004 | Chan et al. |
| 6,705,869 B2 | 3/2004 | Schwartz |
| 6,710,788 B1 | 3/2004 | Freach et al. |
| 6,755,659 B2 | 6/2004 | LoSasso et al. |
| 6,757,902 B2 | 6/2004 | Katz et al. |
| 7,000,187 B2* | 2/2006 | Messinger et al. .......... 715/705 |
| 7,036,079 B2 | 4/2006 | McGlinchey et al. |
| 7,047,446 B1* | 5/2006 | Maurer et al. ................. 714/38 |
| 7,047,498 B2* | 5/2006 | Lui et al. .................... 715/762 |
| 2001/0049084 A1 | 12/2001 | Mitry |
| 2002/0107681 A1 | 8/2002 | Goodkovsky |
| 2002/0118220 A1 | 8/2002 | Lui et al. |
| 2002/0178181 A1 | 11/2002 | Subramanyan et al. |
| 2002/0180770 A1 | 12/2002 | Sirhall |
| 2003/0002445 A1 | 1/2003 | Fullana et al. |
| 2003/0008266 A1 | 1/2003 | LoSasso et al. |
| 2003/0023686 A1 | 1/2003 | Beams et al. |
| 2003/0144756 A1* | 7/2003 | Koehler et al. ................ 700/97 |
| 2003/0154176 A1 | 8/2003 | Krebs et al. |
| 2003/0211450 A1 | 11/2003 | Sofia et al. |
| 2004/0015813 A1 | 1/2004 | Yerushalmy |
| 2004/0023195 A1 | 2/2004 | Wen et al. |
| 2004/0091846 A1 | 5/2004 | Aughenbaugh et al. |
| 2004/0130572 A1 | 7/2004 | Bala |
| 2004/0250214 A1 | 12/2004 | McGlinchey et al. |
| 2004/0255270 A1 | 12/2004 | McGlinchey et al. |
| 2005/0033713 A1 | 2/2005 | Bala et al. |
| 2005/0071761 A1* | 3/2005 | Kontio ....................... 715/711 |
| 2005/0114785 A1 | 5/2005 | Finnigan et al. |
| 2005/0120308 A1* | 6/2005 | Gibson et al. ............... 715/779 |
| 2005/0132268 A1* | 6/2005 | Kammerer ................. 715/513 |
| 2005/0138559 A1* | 6/2005 | Santos-Gomez et al. .... 715/709 |
| 2006/0059433 A1 | 3/2006 | McGlinchey et al. |
| 2006/0100849 A1* | 5/2006 | Chan ............................. 704/8 |
| 2006/0184880 A1 | 8/2006 | Bala |
| 2006/0184888 A1 | 8/2006 | Bala |

OTHER PUBLICATIONS

Overview of the Studio, http://www.rocketsoftware.com/portfolio/activeguide/screenshot1.htm, p. 1, Jun. 20, 2005.

Creating a Highlight, http://www.rocketsoftware.com/portfolio/activeguide/screenshot1.htm, p. 1, Jun. 20, 2005.

Frey, Gerhard, "Office hilfsbereit Assistenten in eigenen VBA-Makros sinnvoll nutzen," CT Magazin Fuer Computer Technik, Heise Zeitschriften Verlag, Hanover, DE (Germany), No. 24, Nov. 20, 2000, pp. 292-294, 296.

* cited by examiner

SYSTEMS AND METHODS FOR TEACHING A PERSON TO INTERACT WITH A COMPUTER PROGRAM HAVING A GRAPHICAL USER INTERFACE

RELATED APPLICATIONS

The present application is related to and claims priority from U.S. Provisional Application No. 60/608,360, entitled "A Software Tool That Provides for Interacting with Graphical User Interface Objects through Computerized User Emulation," filed Sep. 8, 2004, with inventors David L. Adkins, Mark R. Adkins, and Jeffrey W. Alton, which is incorporated herein by reference in its entirety.

FIELD OF THE INVENTION

The present invention relates to devices that implement a graphical user interface (GUI) and utilizes input devices to allow users to interact with the device. More particularly, the present invention relates to software tools used to instruct users in the operation of software applications that run upon such devices.

BACKGROUND OF THE INVENTION

Software applications touch the lives of millions of people everyday. They are used for numerous critical business and personal tasks and functions. The ubiquity of software coupled with its increasing complexity has made it imperative that the users of software are able to quickly learn and use their software. Increasingly, this imperative is met through the use of online and computer-based training and instruction.

One of the shortcomings of traditional online and computer-based instruction material intended to train users in the operation of software is that it offers a generally passive learning experience and does not engage the user with sufficient interactivity to stimulate higher levels of learning. High-end instruction software may include graphics, video, animation and voice to create a professional and appealing presentation, but the content often lacks both required user interaction and relevance to actual job performance.

The training content is usually delivered in a browser or other external application, and the user is required to switch back and forth between the training window and the live application (the application on which the user is being trained), which can become tedious, confusing, time consuming, and ineffective for the user.

More advanced forms of such training material make use of "simulation" techniques in which a software application is simulated in a training environment in order to allow the user to perform tasks as if the user were actually using the product. Though this technique overcomes many of the shortcomings of less interactive instruction material, it is very costly to produce and maintain. Once the initial simulation is constructed according to one particular interface, it must be updated every time the software application's interface is modified (either by the user or the software producer), or every time a new version of the software is released. Also, the simulation is normally limited to the most basic functions and processes since the cost of recreating every function and capability of the software application in the simulated environment would be exorbitant. As a result, investment in new versions of software is less likely, leaving companies with less skilled employees, and could possibly result in a decrease in the discovery and experimentation of cutting edge technology.

In addition, the user is unable to explore the full capabilities of the software product due to the limitations of the simulation. Developers of simulated instruction products are likewise hindered in overcoming this limitation due to the cost and difficulty of producing and maintaining a simulation that offers such a breadth of function and capability.

A need, therefore, exists to provide software instruction that combines the power of multimedia communication with the effectiveness of interactive learning in a way that is efficient and cost-effective to produce and maintain.

BRIEF DESCRIPTION OF THE DRAWINGS

In order that the advantages of the invention will be readily understood, a more particular description of the invention briefly described above will be rendered by reference to specific embodiments that are illustrated in the appended drawings.

Understanding that these drawings depict only typical embodiments of the invention and are not, therefore, to be considered to be limiting of its scope, the invention will be described and explained with additional specificity and detail through the use of the accompanying drawings, in which.

SUMMARY OF THE INVENTION

Figure 1:
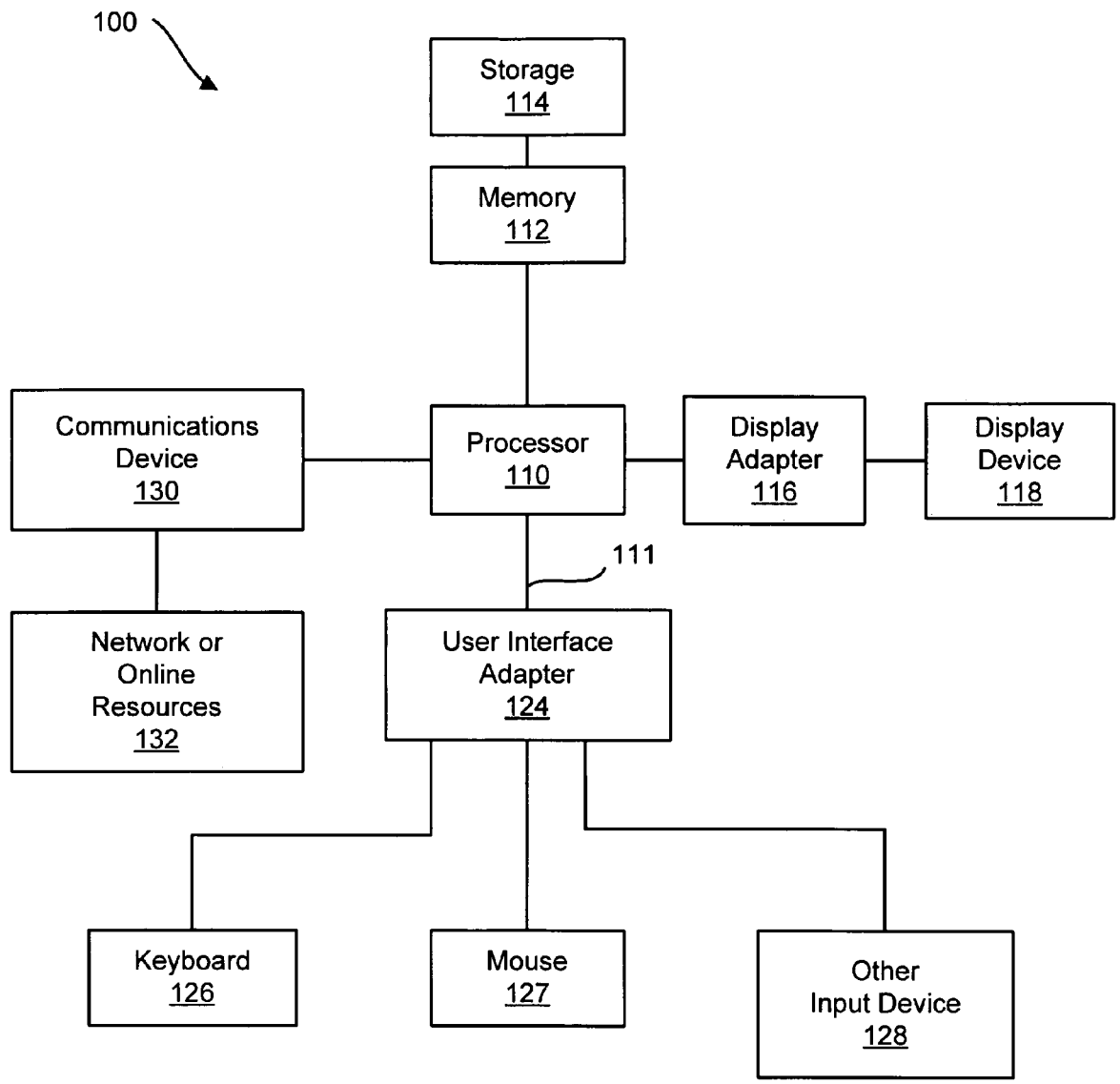
FIG. 1 illustrates a block diagram of one embodiment of a system and its environment in which the present invention may be practiced.

The present invention has been developed in response to the present state of the art, and in particular, in response to the problems and needs in the art that have not yet been fully solved by currently available instructional tools. Accordingly, the present invention has been developed to provide an instructional tool that overcomes many shortcomings of the prior art.

Specifically, the present invention provides systems and methods for interacting with graphical user interface (GUI) objects through, in part, emulated user input in order to instruct a user how to operate a computer program. These systems and methods may be implemented in a number of different ways. For example, in one embodiment, software may be distributed on a computer-readable medium (e.g. stored on a CD) to implement the systems or methods disclosed herein.

In one embodiment, software is provided that enables a developer to formulate a script that contains step-by-step instructions indicating to a person how to perform a task within a computer program. The formulated script does so through, in part, interacting with graphical user interface objects of the computer program. The present invention may be used with a wide variety of different computer programs, such as Microsoft® Word produced by Microsoft Corp. of Redmond. Wash.

The formulated script is executed by displaying a partial graphical overlay on top of an actual, non-simulated graphical user interface of the computer program. Each partial graphical overlay may include text, graphics, animation, or video indicating to a user how to provide input to the associated graphical user interface object of the computer program to perform a step of the task. The partial graphical overlay obscures only a portion of the user interface of the computer program, such that the user may still view the pertinent graphical user interface object to which input must be directed to perform a step of the task.

Each partial graphical overlay is positioned adjacent to the pertinent graphical user interface object of the program regardless of the position of that object without any reprogramming of the underlying computer program. In one embodiment, the operating system on which the computer program is running is queried to determine the location of the pertinent graphical user interface object. Using this information, the partial graphical overlay is positioned adjacent to the pertinent graphical user interface object. Because no modification of the computer program is required, the present invention may be easily implemented and used with a wide variety of different computer programs. Furthermore, it is not necessary to persuade manufacturers of computer programs to modify their programs to comply with cumbersome protocols or standards. The present invention interacts with graphical user interface objects already present and accessible by the present invention.

In addition, the instruction provided by the present invention is more effective than prior teaching methods because the partial graphical overlays are shown on top of an actual, non-simulated version of the computer program. When a user receives training in a simulated version of a computer program, the user must make adjustments to try to understand the differences between the simulated software and the software he or she is using, potentially resulting in confusion and diminishing the effectiveness of the teaching process. The systems and methods of the present invention perform the task on the software in which the user will perform the task, significantly increasing the effectiveness of instruction provided.

The formulated script may, in one embodiment, perform the steps of the task for the user. Alternatively, the script may instruct a user to perform a step of the task and await correct user input before displaying instructions pertaining to the next step of the task.

The script is formulated by reference to an entity map, which contains programming instructions for accessing at least one graphical user interface object of the program. The entity map may further include a name associated with each programming instruction for simplified access to a programming instruction. Individual programming instructions, in one embodiment, may be incorporated directly (hardcoded) into the script from the entity map. In alternative embodiments, the entity map may be dynamically or statically referenced by a particular script. Dynamic referencing of the entity map enables adaptation of the particular script, when the script is executed, to a new version of the computer program by creation of an entity map adapted to the new version of the computer program. Accordingly, the script does not need to be reformulated when a new version of the computer program is released.

User input during execution of the script is optionally monitored. The monitoring of user input may be useful to determine the skill level of a particular user. If the input provided by a particular user is frequently incorrect, this information may be saved in a log to determine what type of training the user needs to improve his or her skills. In one embodiment, incorrect input is prevented from being received by the computer program during execution of a script. In another embodiment, corrective instruction is provided to a user who submits incorrect user input during execution of the script. The corrective instruction may include graphics, text, audio, video, or animation.

In one embodiment, the present invention may be used with either a Learning Management System (LMS) or a Learning Content Management System (LCMS). Both LMS's and LCMS's are used in the e-Learning industry to present e-Learning content to users and track their usage, performance, and skill sets. The inclusion of the invention in such a system allows the system to present content to the user that instructs the user within the context of the computer program about which instruction is provided (i.e., the user would see tasks being performed within the application that he or she is learning about).

For example, an LMS may contain a lesson on creating shipping labels in a word processor. The LMS would use the invention to deliver content that would show the actual creation of the shipping labels in the user's own word processor, moving the mouse cursor, sending keyboard input, etc., as needed. The invention could optionally display any video or animation and play any sound or other multimedia content as needed in order to convey necessary information or instruction. Any data created through the execution of the script of the present invention would be real, viable data that could be used in the future. Any user input provided could be stored by the LMS or LCMS and used by administrators for analysis or tracking.

In still another embodiment, the present invention involves task specific workflows incorporated in an LMS or LCMS, computer program, or a user's extension or customization of a computer program. These workflows would guide a user through the specific steps needed to perform a task. The invention would only allow the user to interact with the objects that were specified by the workflow. For example, the application implementing the invention may play a sound file that instructs the user to press a certain button in the computer program. The script could also cause to be displayed an arrow pointing to the button to be activated. The invention could then allow the user to move the computer's mouse pointer and instruct the system to ignore any mouse clicks except the correct user input to perform the step.

In yet another embodiment of the present invention, a user's ability to perform a task within a computer program may be tested. The present invention could track the user's input and/or verify whether the user has correctly performed the specified task. Coupled with an LMS or LCMS, the result of the verification could be recorded and stored in a database. For example, an LMS may present the user with a test at the completion of a course in order to assess the user's comprehension of the presented material. One of the test questions may require the user to perform a task. The LMS would use one embodiment of the present invention in order to track the user's interaction with the computer program and verify whether or not the user had successfully completed the operation. The present invention would communicate the result of the test to the LMS, which, in turn, would record the result in the database.

In a further embodiment, the present invention provides a system in which tasks normally performed by the user can be automated. An example of such an embodiment would be an application that executes quality assurance tests on a computer program. For this example, the present invention may run scripts to test whether a particular function of the computer program executes properly. Another example is the automation of tasks in order to increase efficiency of a particular task or to assist individuals with disabilities or handicaps to perform particular tasks.

Reference throughout this specification to features, advantages, or similar language does not imply that all of the features and advantages that may be realized with the present invention should be, or are, in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined, in any suitable manner, in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention, as well as other features and advantages not listed, will become more fully apparent from the following description and appended claims, or may be learned by the practice of the invention as set forth hereinafter.

DETAILED DESCRIPTION OF THE INVENTION

Various embodiments of the invention are now described with reference to FIGS. 1-16. The members of the present invention, as generally described and illustrated in the Figures, may be implemented in a wide variety of configurations. Thus, the following more detailed description of the embodiments of the systems and methods of the present invention, as represented in the Figures, is not intended to limit the scope of the invention, as claimed, but is merely representative of presently preferred embodiments of the invention.

Many of the functional units described in this specification have been labeled as modules or components, in order to more particularly emphasize their implementation independence. For example, a module may be implemented as a hardware circuit comprising custom VLSI circuits or gate arrays, off-the-shelf semiconductors such as logic chips, transistors, or other discrete components. A module or component may also be implemented in programmable hardware devices such as field programmable gate arrays, programmable array logic, programmable logic devices or the like.

Modules or components may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module or component need not be physically located together, but may comprise disparate instructions stored in different locations which, when joined logically together, comprise the module and achieve the stated purpose for the module.

Indeed, a module or component of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Each of the methods or steps of each method described below may likewise be implemented in various ways, such as using hardware, software, or a combination of the two.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics may be combined in any suitable manner in one or more embodiments. In the following description, numerous specific details are provided, such as examples of programming, software modules, components, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIGS. 1 through 16 illustrate example embodiments of systems and flowcharts for performing specific tasks of the software tool. Although the present invention will be described with reference to an illustrative embodiment shown in the figures and described below, those skilled in the art will appreciate that the present invention may be implemented in a number of different applications and embodiments and is not specifically limited in its application to the particular embodiment depicted herein.

FIG. 1 illustrates a block diagram of a system 100 and its environment in which the present invention may be practiced according to one embodiment of the present invention. The system 100 includes a central processor unit (CPU) 110 and a bus 111 that enables communication between the processor 110 and various other components of the system 100. A display adapter 116 and a display device 118, such as a CRT monitor or LCD screen, are also typically used. The system 100 normally employs some form of memory 112, such as random access memory (e.g., RAM), and storage 114 (e.g., a hard drive) in order to retain, store, and manipulate data.

The system 100 typically includes a user interface adapter 124, which enables user interface devices (such as a keyboard 126, mouse 127, or other input device 128) to provide user input to the system 100. The user input devices 126, 127, 128 enable a user to issue commands, manipulate data, or otherwise interface with the system 100. The various input devices 126, 127, 128 and mechanisms employed by a user to provide input to the system (collectively referred to as "input devices") could consist of a mouse, keyboard, trackball, touch screen, speech recognition device, or any other device or system which allows a user to provide input to the system 100.

The system 100 may also communicate with other devices or resources via a communications device 130, such as a wireless or wired network adapter or modem, in order to access network or online resources 132. The system 100 may be networked with other computers or devices in, for example, a local area network (LAN) or wide area network (WAN). The system 100 may connect to the Internet or other communications systems via a communications device 130, as will be understood by those of skill in the art. The system 100 can be a personal computer, workstation, laptop or notebook computer, personal digital assistant, cellular phone, or one of a wide array of other devices which allow user input. Indeed, any device or system with a graphical user interface (GUI) that utilizes user input could make use of the systems and methods of the present invention.

Many modern computing devices 100 employ a graphical user interface (GUI). Such devices 100 are normally equipped with a display device 118 and one or more input devices 126, 127, 128 that allow a user to manipulate data or information stored by the device 100. In such a system, data and processes that are stored or running on the device 100 are represented graphically on the display device 118. The user manipulates the various input devices 126, 127, 128 to alter and interact with the graphically displayed objects. The actions performed by the user upon these devices 100 are translated into signals that are received by the appropriate user interface adapter 124. The adapter 124, in turn, translates the signals it receives into an appropriate system message that can be processed by the computing device 100. The received signals cause the computing device 100 to modify data and processes it maintains, thus allowing the user to interact with and modify the abstract data in a visual and tactile manner.

The systems and methods disclosed herein may be implemented in connection with a wide variety of different types of computing devices 100 that use a graphical user interface. For example, the computing device 100 may be embodied as a personal data assistant (PDA), notebook computer, desktop computer, a server, tablet PC, or wireless phone.

Figure 2:
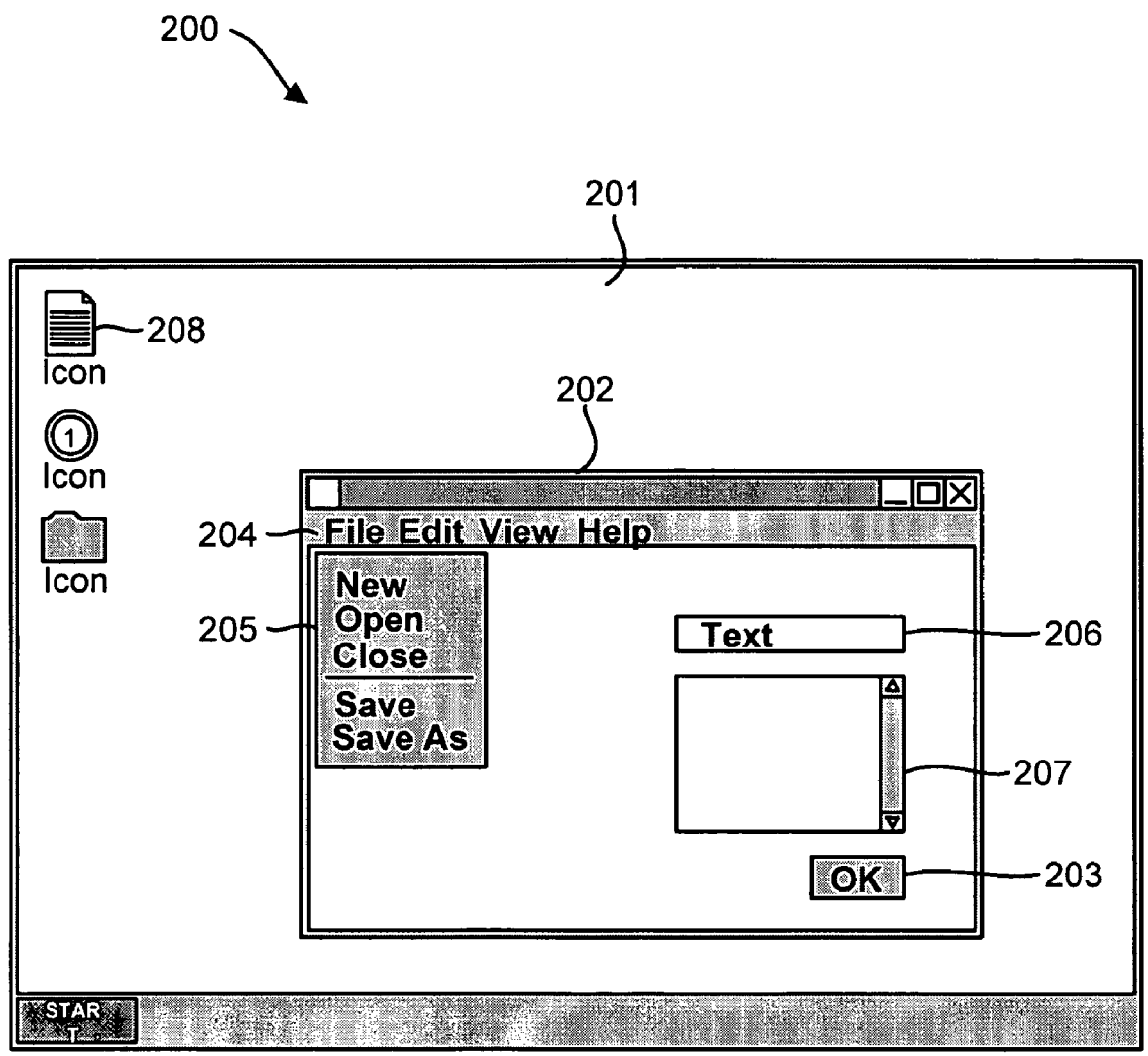
FIG. 2 illustrates one embodiment of a graphical user interface (GUI) with which the present invention may be used.

FIG. 2 illustrates one embodiment of graphical user interface (GUI) 200, which may be depicted on a display device 118. The depicted graphical user interface 200 includes a desktop 201, which is an area that contains various graphical objects viewable by the user. The desktop 201 contains a window 202 that graphically represents a distinct application, process, or function. The desktop 201 and window 202 optionally include graphical user interface objects ("GUI objects"), such as buttons 203, menus 204, menu items 205, text fields 206, item lists 207, and icons 208. Those skilled in the art will understand that there are many different types of GUI objects beyond those depicted in FIG. 2.

The objects displayed in the graphical user interface 200 are merely visual representations of applications, data, functions, and processes maintained or that may be initiated by the computing device 100. The computing device 100 maintains links between the GUI objects and the actual data and processes with which they are associated. The common method for doing so is to maintain a list of all active GUI objects, whether at the system or application level, and link the pertinent GUI object with the actual data via a handle, resource identification number, or other reference. It will be apparent to those skilled in the art that the systems and methods described herein may be implemented in connection with numerous GUI systems currently available, such as Microsoft® Windows operating system produced by Microsoft Corp. of Redmond, Wash.

As will be explained more fully below, one embodiment of the present invention provides a mechanism by which a developer can create and deliver interactive content that indicates to a user how to operate a particular computer program. The interactive content may incorporate and coordinate text, sound, video, animation, images, etc., to provide instruction to a user. The interactive content may be coupled with interactive actions that occur, or the user can cause to occur, through interacting with GUI objects of an actual, non-simulated computer program about which the user is learning. "Interactive content" and "interactive actions" may include instructions sent to a computer program that emulate user interaction within a computer program or instruct the user to provide such interaction. Through the use of the interactive content and interactive actions, the content developer is able to cause the user's mouse cursor to move around the screen, make selections from menus and lists, input keyboard data into a particular field, and emulate any action that the user could perform using the input devices available. One embodiment of the present invention instructs a user to provide specific input to perform a step of a task within the computer program and awaits correct user input before providing instructions related to the next step of the task. The present invention is also capable of executing system commands, processes, and functions that the content developer decides are required in order to facilitate the instruction that is occurring. For example, the content developer may cause the invention to load a particular computer program, if it is not already loaded. For expediency, the content developer may choose to not load that computer program through the same process a user would, but instead simply process a command to load the application.

Figures 3A, 3B:
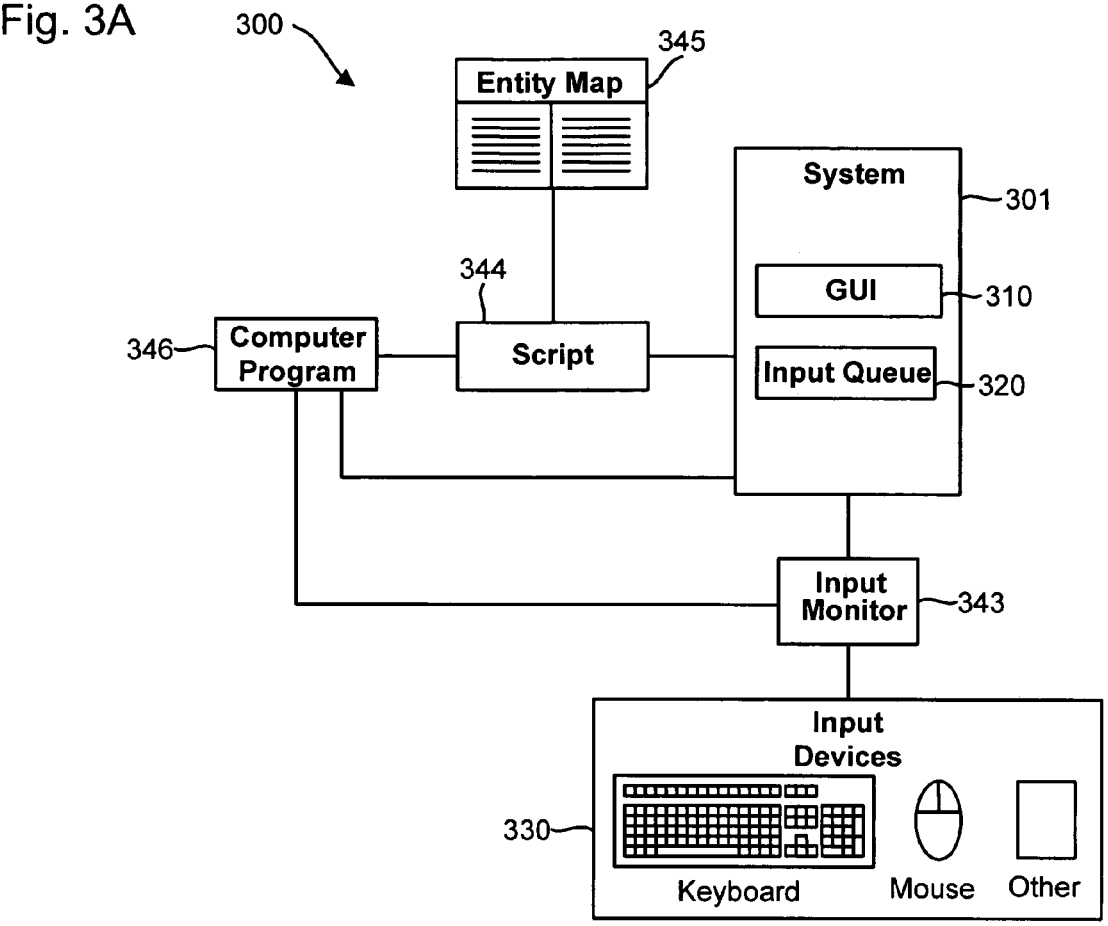
FIG. 3A illustrates a block diagram of a system operating in conjunction with the present invention according to one embodiment of the present invention.
FIG. 3B illustrates one embodiment of a conceptual entity map to be used in conjunction with an embodiment of the present invention.

FIG. 3A is a block diagram 300 of a system 301, or computing device, operating in conjunction with one embodiment of the present invention. The illustrated system 301 includes a graphical user interface 310 and an input queue 320, which accepts user input via various input devices 330. In one embodiment, the present invention includes an input monitor 343 that monitors input received from the input devices 330.

Using a script 344, the present invention simulates user input to GUI objects of a computer program 346 running on the system 301. In response to the simulated user input, the computer program 346 performs a step of a task within the computer program 346. By performing the task using simulated input on the computer program 346 and/or interactive content, the present invention clearly shows a user how to perform the task within the computer program 346 itself.

In an alternative embodiment, the present invention, rather than performing that task itself, indicates to a user how to perform the task using simulated user input and/or interactive content. In such an embodiment, the input monitor 343 determines whether the appropriate user input has been received. When the appropriate user input has been received, the user is instructed to perform the next step in the task. In one embodiment, if incorrect input is received, corrective instruction is provided to the user.

The script 344 accesses (at the time the script 344 is formulated, at run-time, or both) a group of one or more "entities" (collectively referred to as an entity map 345) to determine how to provide simulated user input to a particular GUI object. The entity map 345, which is shown in both FIGS. 3A and 3B, includes programming instructions 347 for accessing at least one GUI object of a particular computer program 346.

As shown in FIG. 3B, each item in the entity map 345 may optionally include a name 349 for convenient reference to programming instructions 347 for accessing the pertinent GUI object. For example, as illustrated in FIG. 3B, an "OK" button for a particular menu or program could be identified in an entity map 345 by the name "App.Buttons.OK" together with a reference to the program or window in which the button is located and the caption or command ID of the button.

The instructions 347 in the entity map 345 need to be specific enough in order for the system 301 to locate the object and obtain a reference or handle to the object via the functions and methods supplied by the system 301 for doing so. In one embodiment, the present invention relies upon the reduction of GUI objects to a data encoding that can be used to locate the system handle or other reference of the object. By obtaining this handle or reference, the system 301 may be queried in order to retrieve information about the GUI object, such as the current location of a GUI object when the script 344 is executed.

The use of names 349 is optional and is not required in each embodiment of the entity map 345. However, in one embodiment, use of the name 349 simplifies accessing a particular GUI object using a set of scripted commands. In other words, the entity may be accessed by reference to the name 349, rather than the programming instruction 347.

In one embodiment, the entity map 345 is stored as a distinct file. However, those skilled in the art will appreciate that the entity map 345 is not necessarily a separate file, but could be compiled along with the implementing computer program 346, could be provided by a stream of data from an online or networked resource, or could even be created "on the fly" and stored only in RAM by an implementation that inventories the list of GUI objects within the system 301. Indeed, any number of known processes and methods could be employed to implement a suitable entity map 345.

Figure 4:
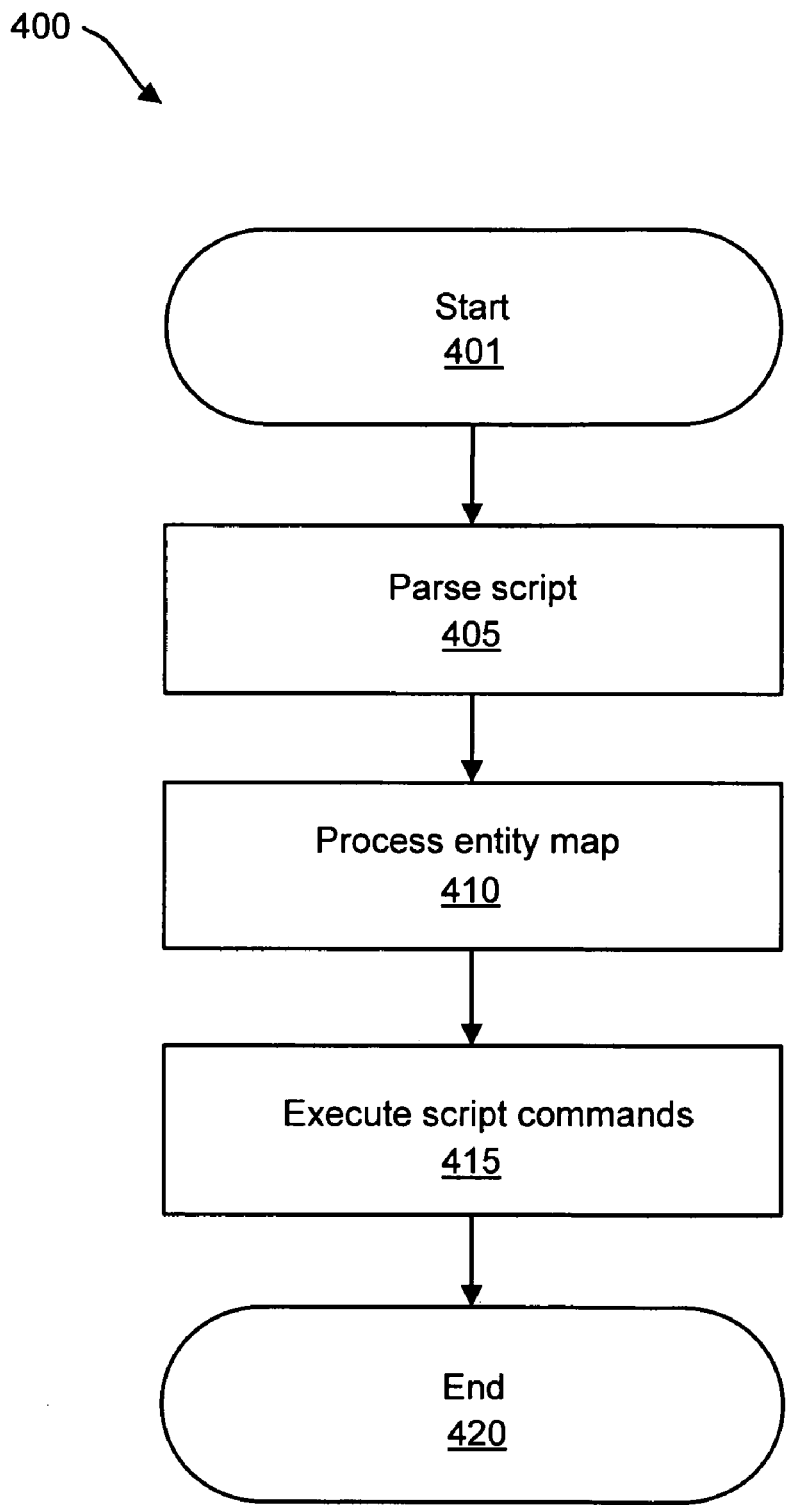
FIG. 4 illustrates a flowchart of one embodiment of a method used to process a script containing instructions to emulate user input.

FIG. 4 is a flowchart 400 of one embodiment of a method of processing a script 344 containing instructions to emulate user input. To start 401, a script 344 is parsed 405, in one embodiment, into directives, commands, and comments. A command is a function that will be performed by the script 344 during execution, while a directive is preparatory to executing the script 344 (such as dynamically linking an entity map 345 to the script 344). In one embodiment, the script 344 includes a header. The header is a directive that indicates which entity map 345 should be used in connection with the script 344. Comments are human readable text and are ignored, or discarded, during the processing of a script 344.

After parsing 405 the script 344, the entity map 345 is then processed and loaded in memory 410 (as will be explained in greater detail in connection with FIGS. 5-7), and the script commands are executed 415. Following execution of the script commands, the script 344 is terminated 420.

Executing a script 345 may be realized in various ways. For example, in one embodiment, the script 344 may be read line-by-line. A particular line may indicate which entity map 345 should be accessed. Each line of the script 344 is executed 415 in sequence until the end of the script 344 is reached.

In another embodiment, the script 344 is processed by parsing 405 the header, processing the entity map 345, and creating the code necessary to execute the commands listed in the script 344. The script 344 is then compiled into an executable format (for example, a .NET assembly) and may then be saved or executed 415.

Those skilled in the art will appreciate that parsing 405, processing 410, and execution 415 of scripts 344 may be realized in a number of different ways within the scope of this invention.

Figure 5:
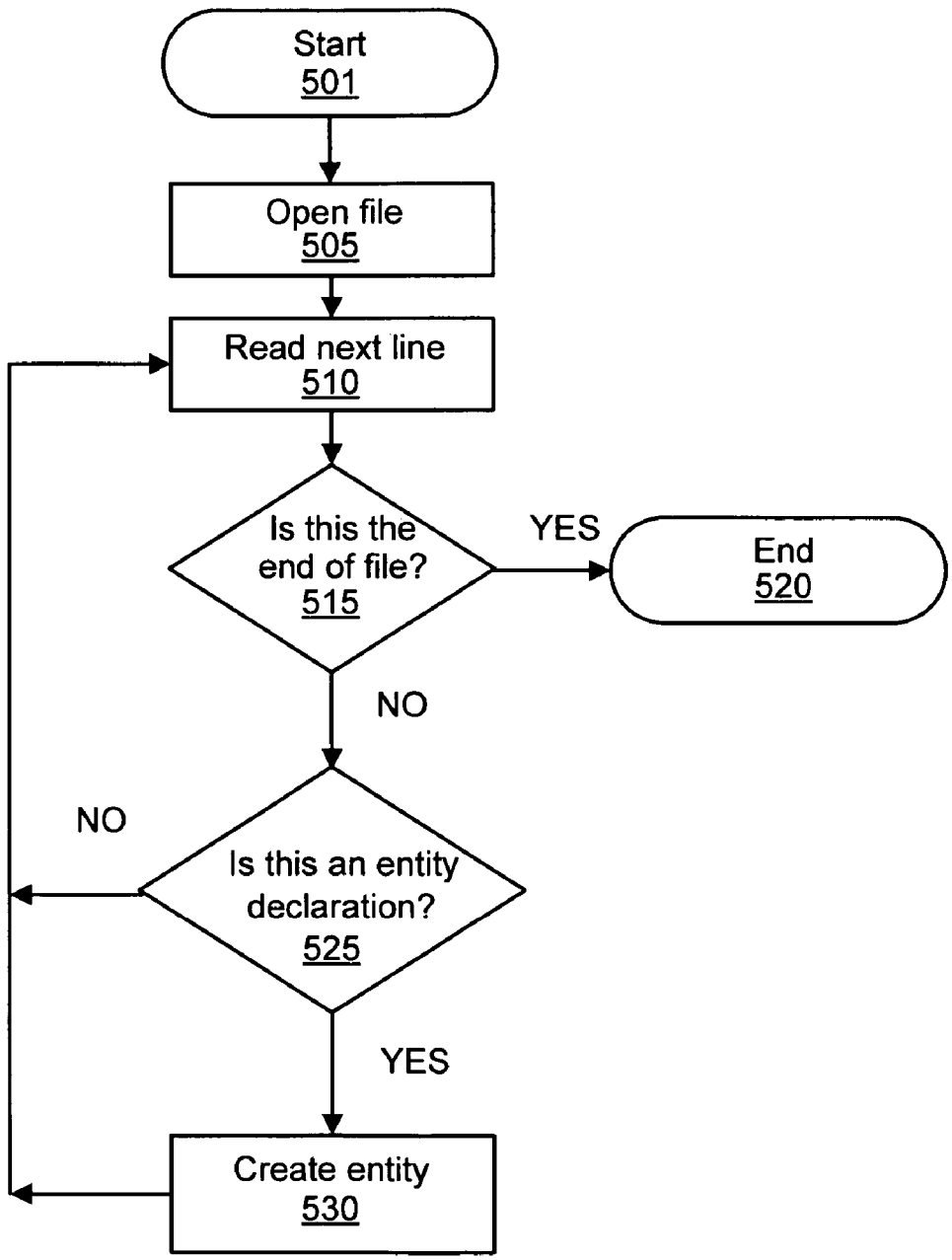
FIG. 5 is a flowchart that illustrates one embodiment of a method of processing an entity map.

FIG. 5 is a flowchart 500 providing a more detailed description of one embodiment of a method of processing 410 an entity map 345, which is described in more general terms in connection with FIG. 4. As the process is initiated 501, a file containing entity map 345 is opened 505 and the next line (in the first instance, the first line) is read 510.

It is then determined 515 whether the end of the script 344 has been reached. When the end of the file is reached, the process is terminated 520.

If the end of the file has not yet been reached, it is determined 525 whether pertinent line/command is an entity declaration 525. If it is an entity declaration, an entity will be created 530. This process will be repeated for each line in the script 344. After an entity is created, it may be used by a script 344 to access or obtain information about an associated GUI object.

In one embodiment, creation of an entity may take the form of a class declaration that will be instantiated at some future point when a script 344 is executed. Alternatively, this process could include the instantiation and storage of an appropriate object in a way that is suitable for future use when commands are being executed, or could also simply involve the creation 530 of an object for use immediately. In another embodiment, an object is instantiated that implements a standard interface and stores the object in a collection. Each object is instantiated with the information it needs to locate the GUI object associated with the pertinent entity. The collection of entities can be traversed according, in one embodiment, to the name of the entity.

In yet another embodiment, a script 344 is converted into an executable assembly. Each entity in the entity map 345, in such embodiment, is a custom class declaration and adds a line of code that will instantiate an appropriately named object when the assembly is executed.

Again, those skilled in the art will appreciate that the processes described in connection with FIG. 5 of the present invention may be realized in using techniques and methods beyond those identified above.

Figure 6:
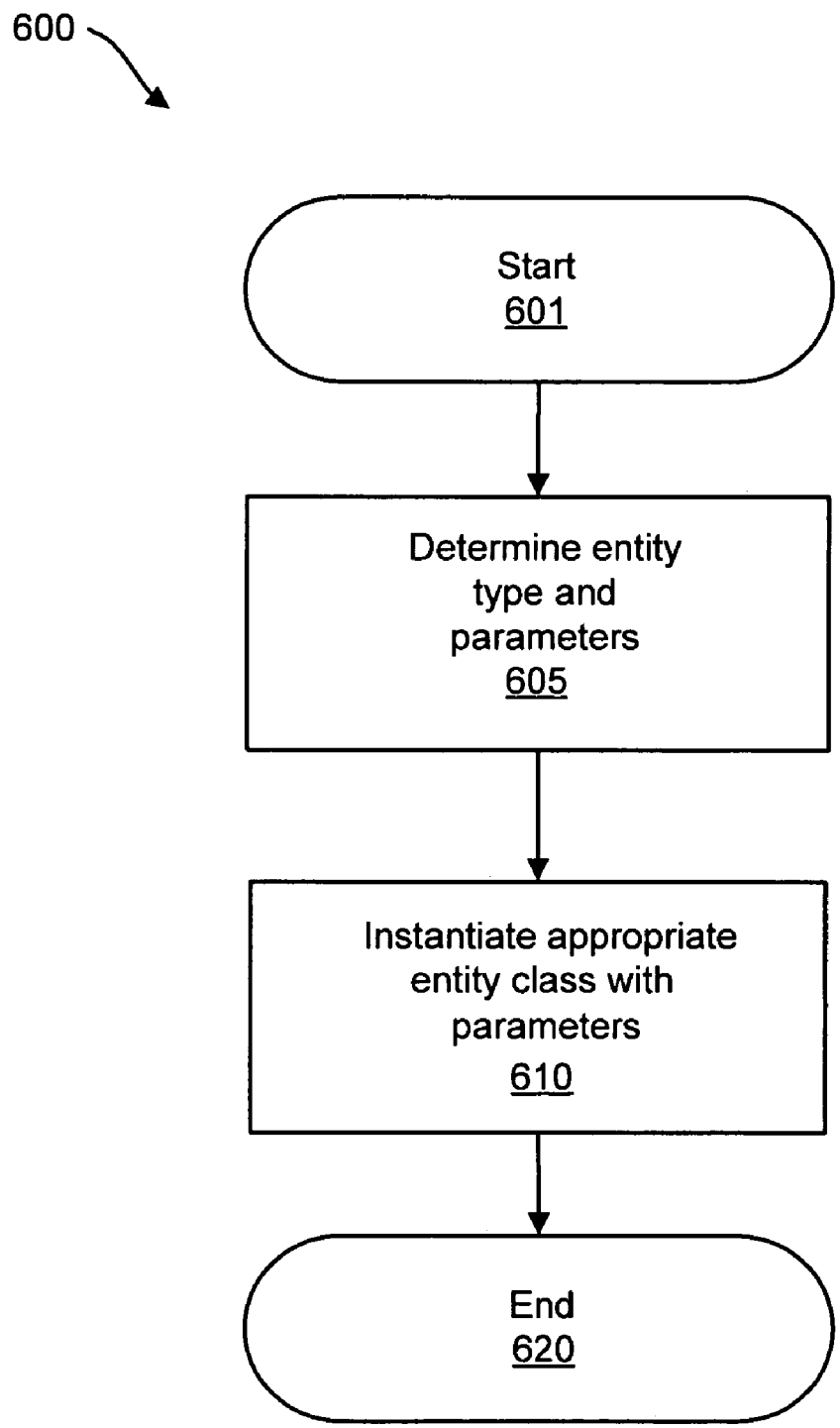
FIG. 6 is a flowchart that illustrates one embodiment of a method of creating an entity.

FIG. 6 is a flowchart 600 of a more detailed description of one embodiment of a method of creating 530 an entity, which is described in more general terms in FIG. 5.

As indicated above, an entity within the entity map 345 includes an instruction 347 used to access a GUI object. This instruction may be linked to a name 349 that can be used to access an associated GUI object. When the entity map 345 is processed 601, each entity in the map 345 is converted into a usable format. In one embodiment, the basic type of entity (e.g., a window, button, toolbar, or menu type entity) and the parameters needed to locate that entity (e.g., name, parent object, class, etc.) is determined 605. In one embodiment, this information is then used to select an appropriate class that implements a standard interface, and instantiate that class with the specific information 610 for the entity. Thereafter, the entity-creation process is then terminated 620.

Once again, those skilled in the art will appreciate that the entity creation process described above is merely one example of a number of different ways of creating an entity within the scope of this invention.

Figure 7:
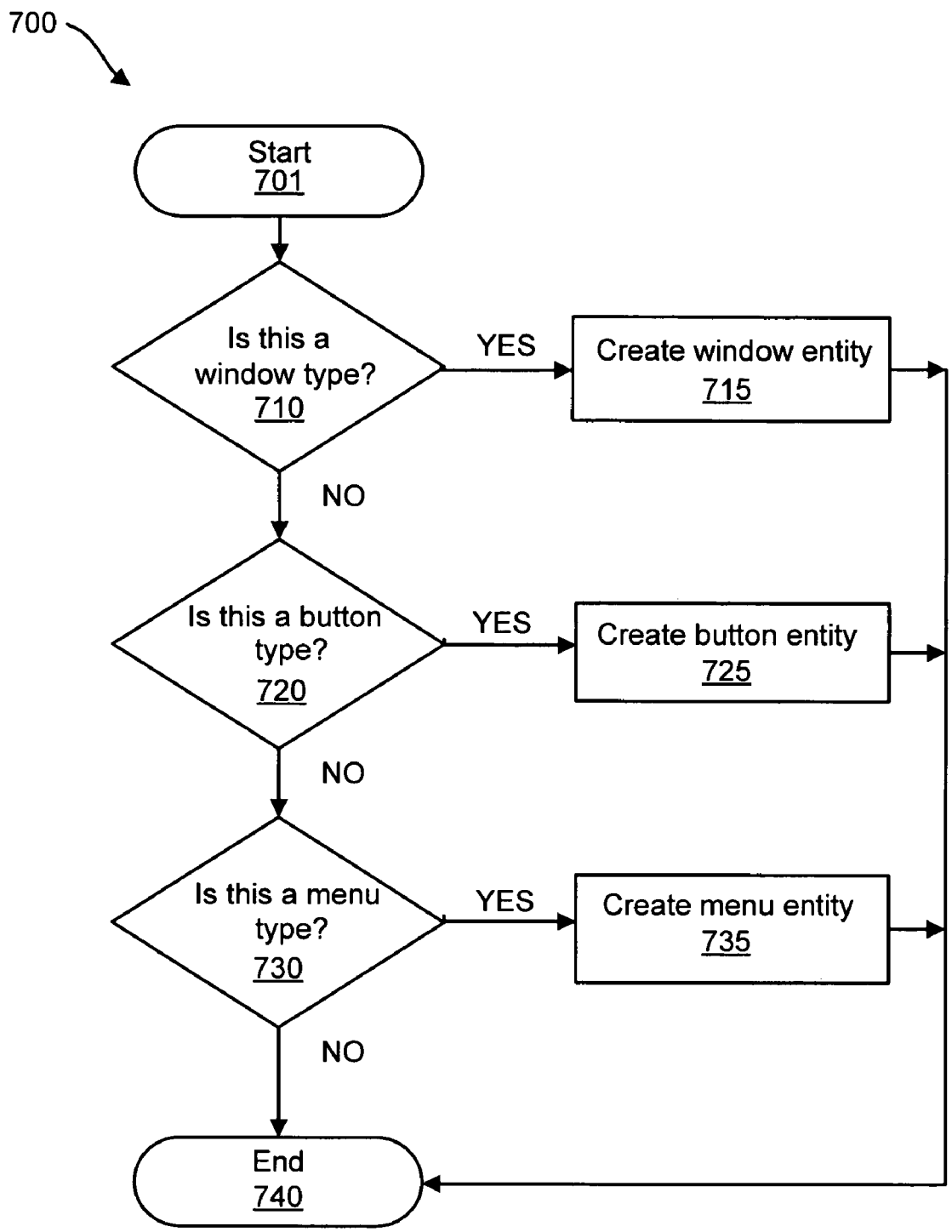
FIG. 7 is a flowchart that illustrates one embodiment of a method of creating different types of entities.

FIG. 7 illustrates a flowchart 700 providing a more detailed description of one embodiment of a method of creating an entity, which is described in more general terms in FIG. 6. After the entity-creation process is initiated 701, it is determined 710 whether the entity to be created is a window type. If it is, a window entity is created 715.

If the entity to be created is not a window entity, it is then determined 720 whether the entity to be created is a button type. If it is, a button entity is created 725.

If the entity to be created is neither a window nor a button type, it is then determined 730 whether it is a menu type entity. If it is, a menu entity is created 735.

In the illustrated embodiment, the entity-creation process is then terminated 740. Those skilled in the art will appreciate that this method may be embodied in a number of different ways. For example, in other embodiments, types of entities beyond those enumerated in FIG. 7 may be considered and created, if appropriate.

Figure 8:
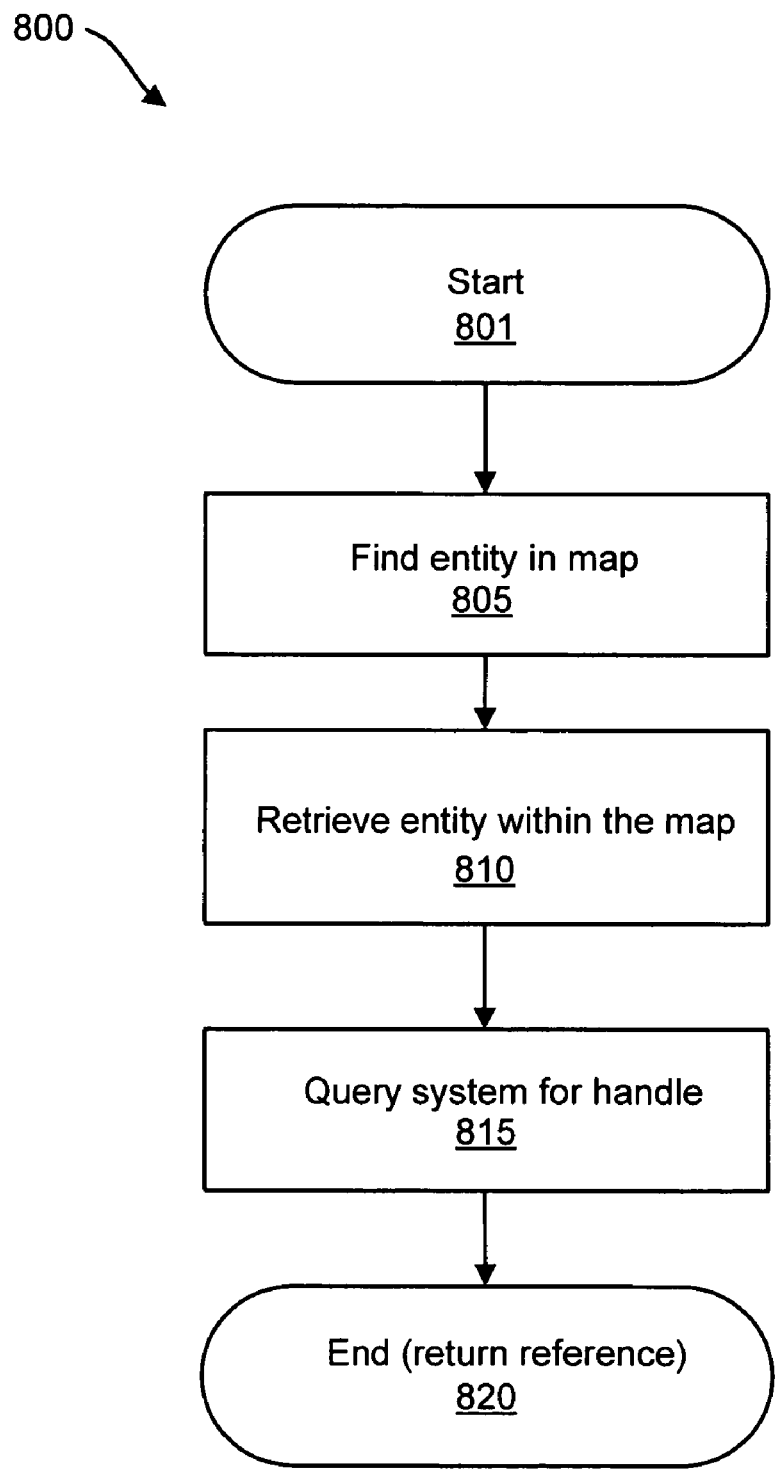
FIG. 8 is a flowchart that illustrates one embodiment of a method for obtaining an appropriate system resource handle for an entity.

FIG. 8 is a flowchart 800 illustrating one embodiment of a method of obtaining an appropriate system resource handle or reference for a GUI object. As this process begins 801, the appropriate entity within in the entity map 345 is found 805. Locating the entity may be performed, for example, by locating the name 349 associated with the particular instructions 347 for accessing the entity within the entity map 345, which is shown in FIG. 3B.

The instructions 347 for the desired GUI object to be located are then retrieved 810. The system 301 (shown in FIG. 3A) is then queried 815 (e.g., by querying the operating system used by the system 301), according to the rules and procedures provided by the system 301 for doing so, in order to obtain the resource handle or other reference that the system 301 maintains for the GUI object. The process is then completed and returns 820 the reference it has obtained to the process that requested it, such that the reference may be used to carry out a task in relation to the pertinent GUI object.

Figure 9:
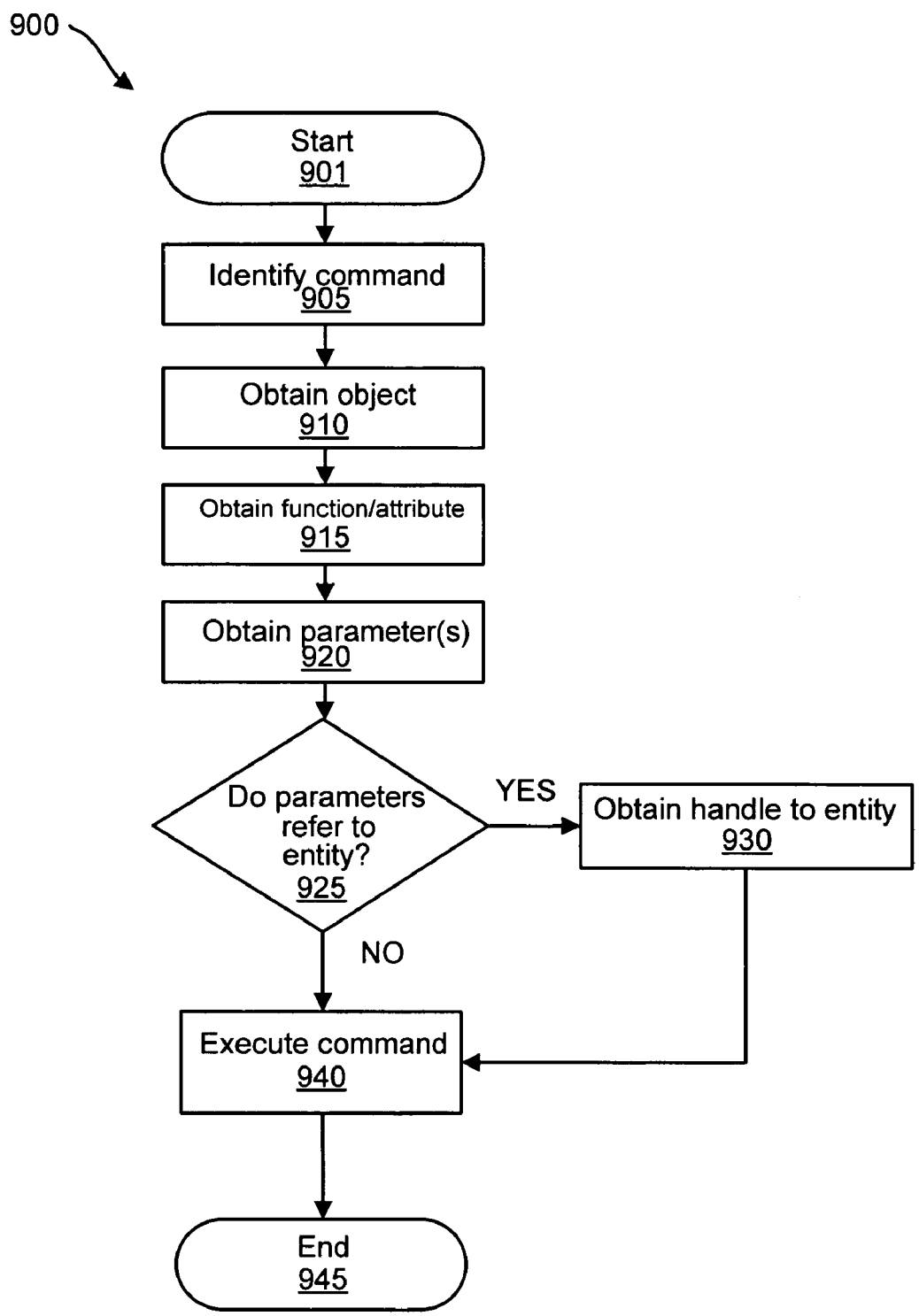
FIG. 9 is a flowchart that illustrates one embodiment of a process for executing script commands.

FIG. 9 is a flowchart 900 of a method for executing an individual command within a script 344 according to one embodiment of the present invention. As the process is initiated 901, a command is identified 905. Generally, the command identified is the next sequential command within the script 344.

Each command may include a programming object upon which a procedure is to be performed, the function/attribute of the object to be accessed or performed, and pertinent parameters for the function/attribute. Accordingly, the first step is to obtain 910 the programming object. Next, the function/attribute of the object is obtained 915. Thereafter, the parameter(s), if any are present in the command, may be obtained 920.

It is then determined 925 whether the parameter(s) refer to an entity. If so, the entity is used to obtain 930 a handle, resource identification number, or other reference for the pertinent entity. Following these steps, the command is executed 940. Of course, if no entity is referenced, the command may be executed 940 without obtaining a handle, resource identification number, or other reference for the pertinent entity.

Thereafter, execution of an individual command is terminated 945 and another command may be executed according to the procedures outlined above or the script may be terminated if the end of a script 344 has been reached. Again, those skilled in the art will understand that a script 344 may be executed in various ways within the scope of this invention beyond the method described above.

Figure 10:
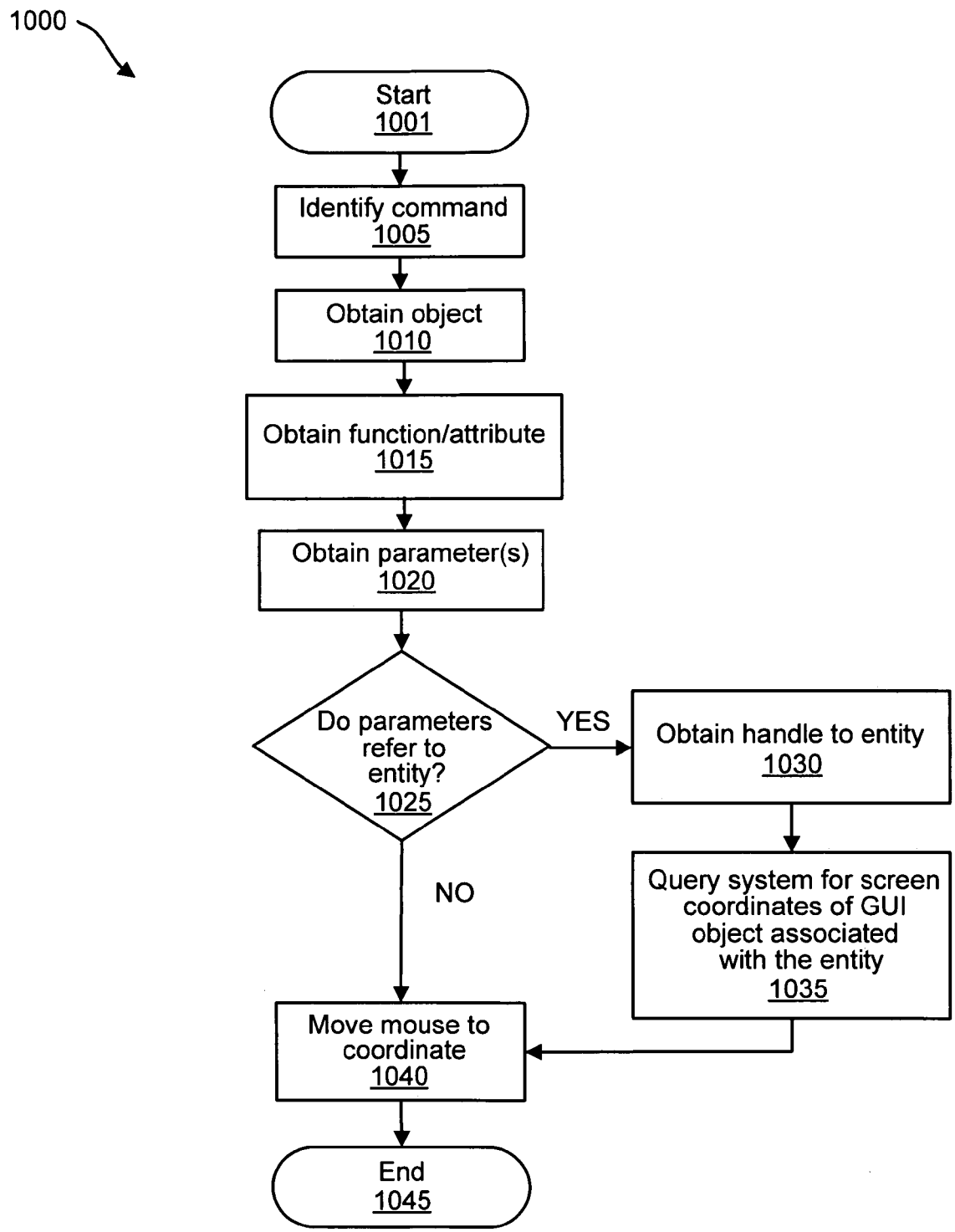
FIG. 10 is a flowchart that illustrates one embodiment of a method of executing a script to move a mouse pointer to a specific graphical user interface object of a computer program.

FIG. 10 is a flowchart 1000 of a method of executing a specific command (e.g., Mouse.Move) to the mouse pointer to a GUI object according to one embodiment of the present invention. The flowchart of FIG. 10 illustrates a specific implementation of executing a command, which is illustrated more generally in FIG. 9. For purposes of FIG. 10, the illustrative Mouse.Move command accepts an entity name 349 (e.g., App.Buttons.OK) for a particular GUI object and then moves the mouse pointer to that object.

As the process is initiated 1001, the command, "Mouse-.Move (App.Buttons.OK)," must first be identified 1005. Then, the object, "Mouse" is obtained 1010. Next, the function/attribute, "Move," of the object is obtained 1015. Thereafter, the parameter, "App.Buttons.OK," may be obtained 1020.

It is then determined 1025 that the parameter refers to a specific entity. Because parameter(s) refer to a specific entity, a handle, resource identification number, or other reference for the pertinent entity is obtained 1030.

The entity may be used to obtain a handle, resource identification number, or other reference for the pertinent GUI object (e.g., an "OK" button) and then determine the screen coordinates of the GUI object by querying 1035 the system 301 (shown in FIG. 3A). Thereafter, the command is executed to move 1040 the mouse pointer to a specific GUI object referenced by the entity. Thereafter, execution of the pertinent command ends 1045.

The above process allows the scripted actions to work regardless of a user's current GUI object configuration. For example, the script 344 referring to the above-mentioned button would move the mouse cursor to the button regardless of the button's position within the graphical user interface. This is because the script 344 does not contain hard-coded coordinates of the button but rather a reference to the button through the entity map 345. This creates enormous flexibility and reliability in creating the interactive content because the content can describe actual GUI objects instead of fixed locations within the graphical user interface. This is critical because if a user moves a particular GUI object or is running the computer program 346 (illustrated in FIG. 3A) at a different screen resolution, identifying a fixed location within the graphical user interface to activate a GUI object may not reliably select or access a GUI object.

The entity map 345 also enables scripts 344 to correctly operate on different versions of computer programs 346. Using the present invention, a single script 344 could be valid for two completely different versions of a computer program 346. For example, a menu item to access the Print function in version 1 of a word processing computer program 346 may exist under the File pull-down menu. In version 2 of the same computer program 346, however, the menu item may exist under the Actions pull-down menu. A script 344 that moves the mouse to the Print menu GUI object and clicks on it to activate the corresponding command would be valid in both versions of the computer program 346 if the script 344 is supplied with the proper entity map 345 for the corresponding version. When the script 344 is executed for version 1, it would use an entity map 345 for the version of the computer program 346 and find the Print menu item under the File menu. When the same script 344 is executed for version 2, it would use an entity map 345 for the new version of the computer program 346 and would locate the Print menu GUI object under the Actions menu.

The present invention, in one embodiment, can also impose hooks upon system input devices 330 that block, filter, or otherwise monitor all user input. This may be done, for example, to prevent the user from interrupting a task being performed or to prevent the user from sending input to the system 301 that is not allowed under the parameters set forth by the current script 344 or workflow being processed. The creation of these hooks is effected by the invention's imposition of itself into the system's underlying input queue 320 (shown in FIG. 3A), using for example the input monitor 343 (also shown in FIG. 3A). This imposition occurs according to the functions and procedures set forth by the system 301 for accomplishing such an input hook.

The illustrative embodiment of the invention provides the ability to install and uninstall these hooks, as needed, in order to block or allow all user input, as well as for the establishment of input filters which would allow only certain input. For example, a user being guided by the invention through a workflow might be instructed to select a specific item from a toolbar. The invention could allow the user to move the mouse cursor anywhere on the graphical user interface 200 (shown in FIG. 2), but ignore all mouse clicks except for a mouse click on the toolbar item. Since, as depicted in FIG. 3, the input monitor 343 captures user input before the system input queue 320, the present invention may verify if the input is allowed under the current conditions.

Figure 11:
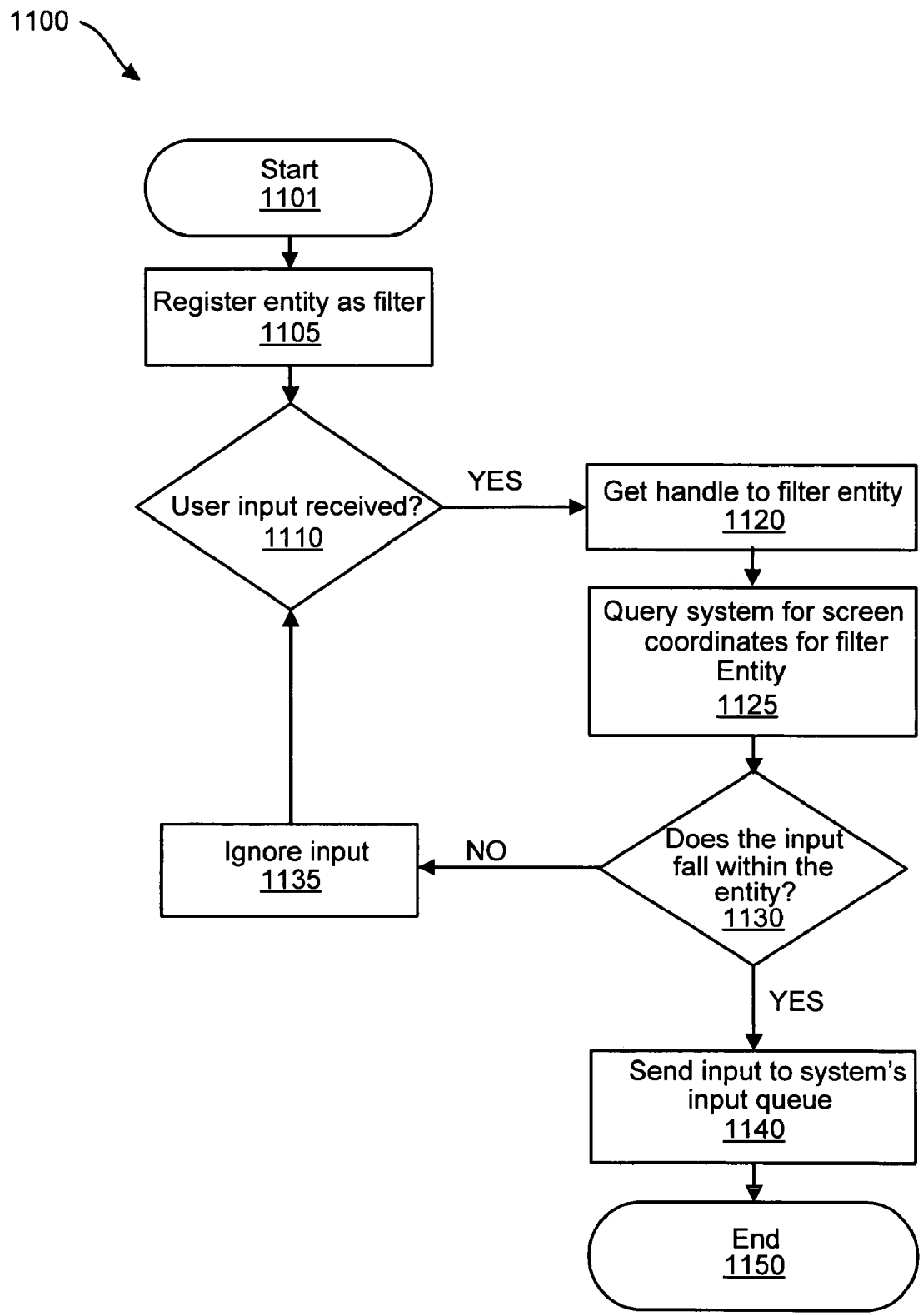
FIG. 11 is a flowchart of a method of one embodiment of filtering, or blocking, user input during execution of a script.

FIG. 11 illustrates a flowchart 1100 of one embodiment of a process for filtering user input. As the process is initiated 1101, an entity is registered 1105 as a filter, thus activating a filter specifically tailored to a GUI object and the type of user input desired. It is then determined whether user input has been received 1110. When input is received, the entity map 345 is used to obtain 1120 a handle or the reference to the object registered as a filter. The system 301 (shown in FIG. 3A) is then queried 1125 to determine the coordinates and boundaries of the of the GUI object and hence the coordinates and boundaries of acceptable user input.

It is then determined 1130 whether the receipt user input falls within the parameters set by the entity. If the user input is incorrect, the input is ignored 1135 and the user input is monitored 1110 once again. If the user input is correct, signals created by the input are sent 1140 to the input queue 320 (shown in FIG. 3A) and this procedure is terminated 1150.

Once the user clicks on the appropriate area or provides other appropriate user input, the next command in the script 344 is executed. Stringing these filters together enables the present invention to guide a user through a workflow to accomplish specific steps of a specific task within a computer program 346 (shown in FIG. 3A).

It will be apparent to those skilled in the art that the ability to monitor and filter input could be used in a variety of manners, including the recording and verifying of user input. One embodiment enables testing or assessing the user's knowledge and skills by determining the frequency of incorrect and correct user input. Another alternative would be to track a user's input to verify that the user is performing functions pertinent to their assigned duties or according to policy or standard.

FIGS. 12A through 12E are screenshots 1200a-e illustrating execution of one embodiment of a script 344 (shown in FIG. 3A) according to the present invention. In the illustrated embodiment, the computer program 346 (shown in FIG. 3A) about which a user is being instructed is Microsoft® Word produced by Microsoft Corp. of Redmond Wash. It should be understood that the illustrative embodiment is merely exemplary and is not limiting of the present invention. The present invention may be used to create scripts 344 with virtually any computer program 346 having a graphical user interface and a suitable operating system, and may be used to create and run scripts 344 to perform almost any function of computer programs 346.

Figure 12A:
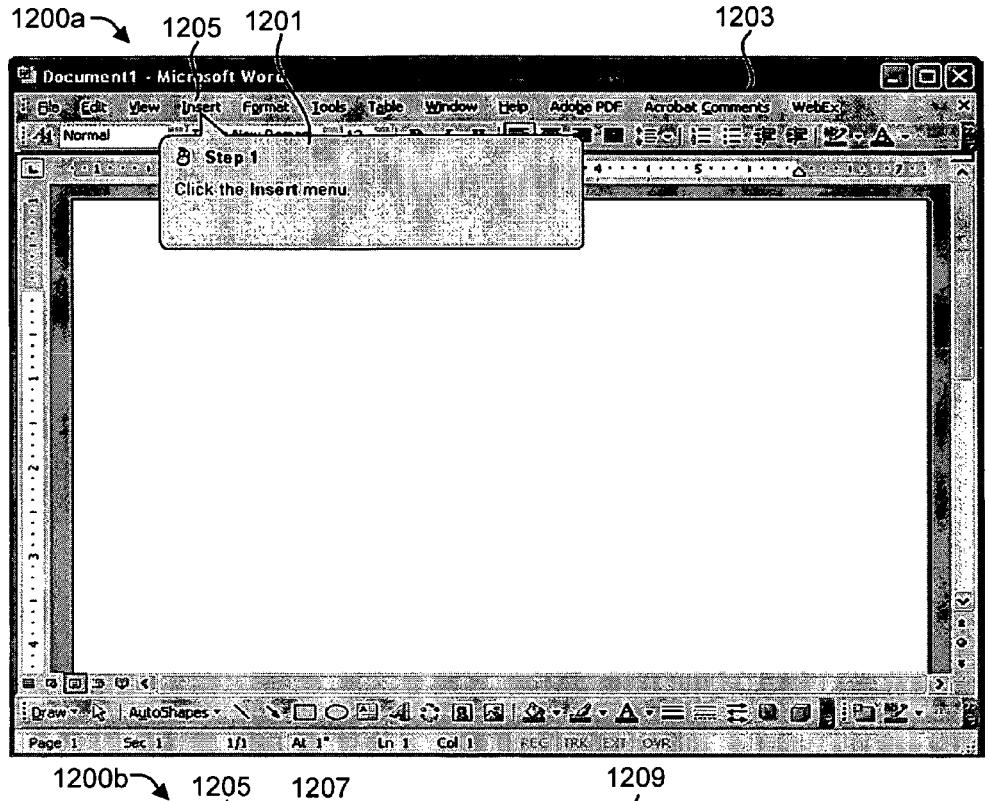
FIGS. 12A-12E are screenshots illustrating steps to performing a task within an illustrative computer program using one embodiment of the present invention.

With reference to FIG. 12A, a first screenshot 1200a is shown. In this screenshot 1200a, the pertinent script 344 has been initiated. The script 344 provides step-by-step instructions indicating to a user how to perform a task (in this case, to create an organizational chart) within the computer program 346. The script 344 causes a first partial graphical overlay 1201 to be displayed on top of an actual, non-simulated graphical user interface 1203 of the computer program 346. The first partial graphical overlay 1201 covers only a portion of the graphical user interface 1203 of the computer program 346, such that the user may still view the remainder of the graphical user interface 1203 of the computer program 346 and interact with the program 346 as indicated by the partial graphical overlay 1201.

The partial graphical overlay 1201 shown in FIG. 12A indicates to a user to "Click on the Insert menu." In one embodiment, clicking on the Insert menu 1205 may be performed for the user or, alternatively, by the user. If the step is to be performed by the user, the next step of the task will not be displayed until the user clicks on the Insert menu 1205.

As indicated above, in one embodiment, a log is kept of user input to determine the skill level of the user. For example, if user input provided is frequently incorrect, this indicates that the user needs additional training. These logs may be saved on a storage device 114 or in memory 112 (shown in FIG. 1) to determine the skill level of a user at a later time and whether the skill level of a particular user is increasing, stagnant, or decreasing. In one embodiment, incorrect user input is prevented from reaching the computer program 346 and thus does not alter or affect the state of the computer program 346.

The first partial graphical overlay 1201 is positioned adjacent to the associated graphical user interface object 1205 (the Insert menu 1205) regardless of the position of the graphical user interface object 1205 without any modification of the source code, or any other type of modification, of the computer program 346. As shown the partial graphical overlay 1201, is positioned adjacent to and points to the Insert menu 1205. In one embodiment, the present invention queries the system 301 (shown in FIG. 3A) on which the computer program 346 is running and determines the location of the graphical user interface object 1205 in question using the entity map 345. Once the location of the graphical user interface object 1205 is determined, the partial graphical overlay 1201 may be positioned adjacent to the appropriate graphical user object 1205.

Figure 12B:
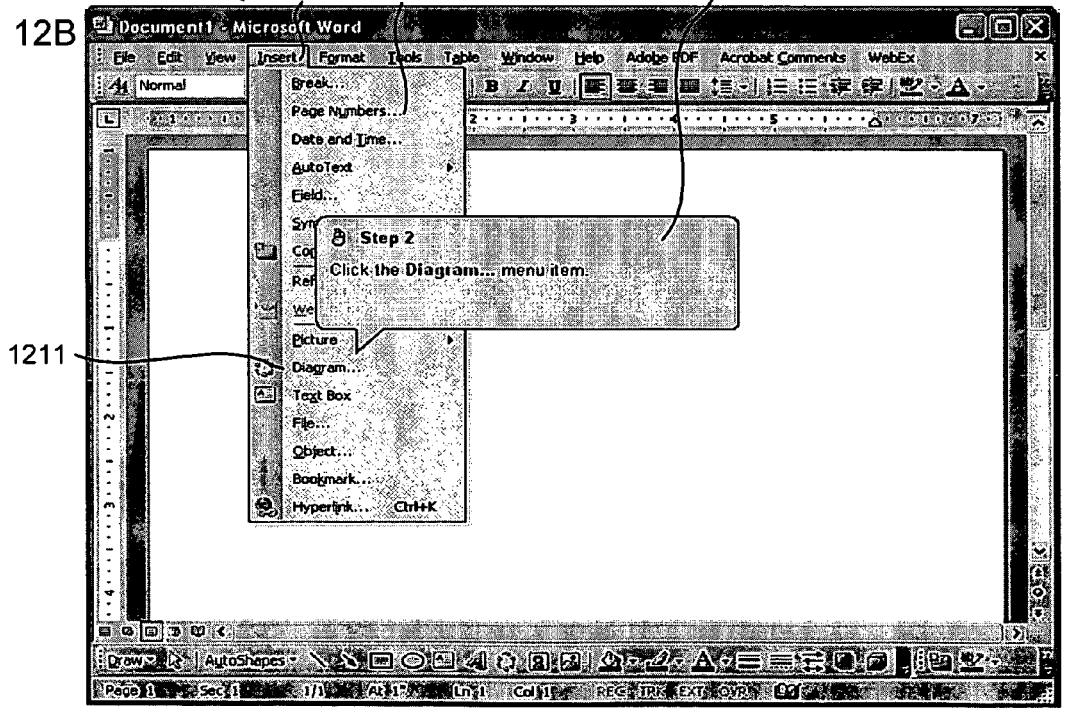

With reference to FIG. 12B, a screenshot 1200b illustrating a second step of the task is shown. As indicated above, the first step in the task could have been performed for the user or by the user. Accordingly, the drop down menu 1207 associated with activation of the Insert menu 1205 is displayed. A second partial graphical overlay 1209 (corresponding to the second step of the task) is displayed and positioned adjacent to the "Diagram . . . " menu item 1211 on the drop down menu activated by clicking on the Insert menu 1205. This partial graphical overlay 1209 of this step indicates to the user to "Click the Diagram . . . menu item."

Figure 12C:
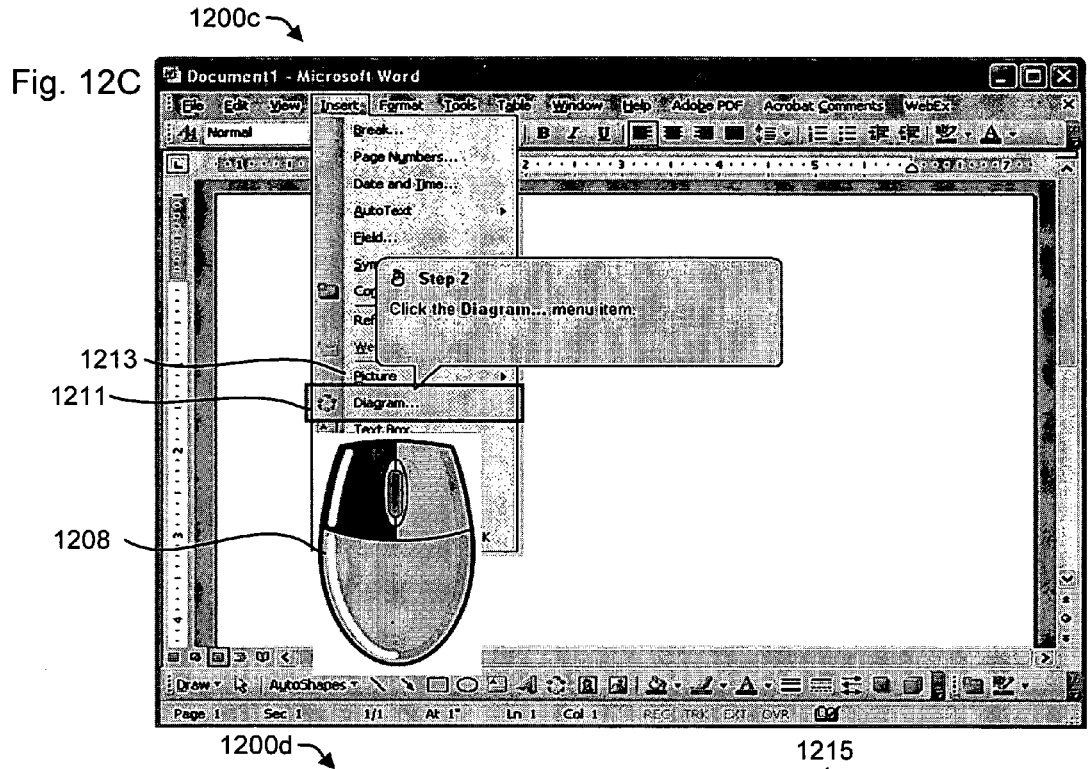

With reference to FIG. 12C, a screenshot 1200c that illustrates one embodiment of corrective instruction 1208 is shown. For purposes of this example, the corrective instruction 1208 illustrated in FIG. 12C is shown in response to incorrect input provided in response to the second partial graphical overlay 1209 (shown in FIG. 12B). For example, if the user clicks on the "Picture" menu item 1213 (rather than the Diagram menu item 1211), the illustrated corrective instruction 1208 could be provided. The illustrated corrective instruction 1208 is a graphical representation of a mouse input device showing the left mouse button being highlighted to indicate to the user the proper technique for selecting the "Diagram . . ." menu item 1211. Of course, other types of corrective instruction could be provided, such as a warning beep, instruction using animation, video instruction, or an audio explanation within the scope of this invention.

Figure 12D:
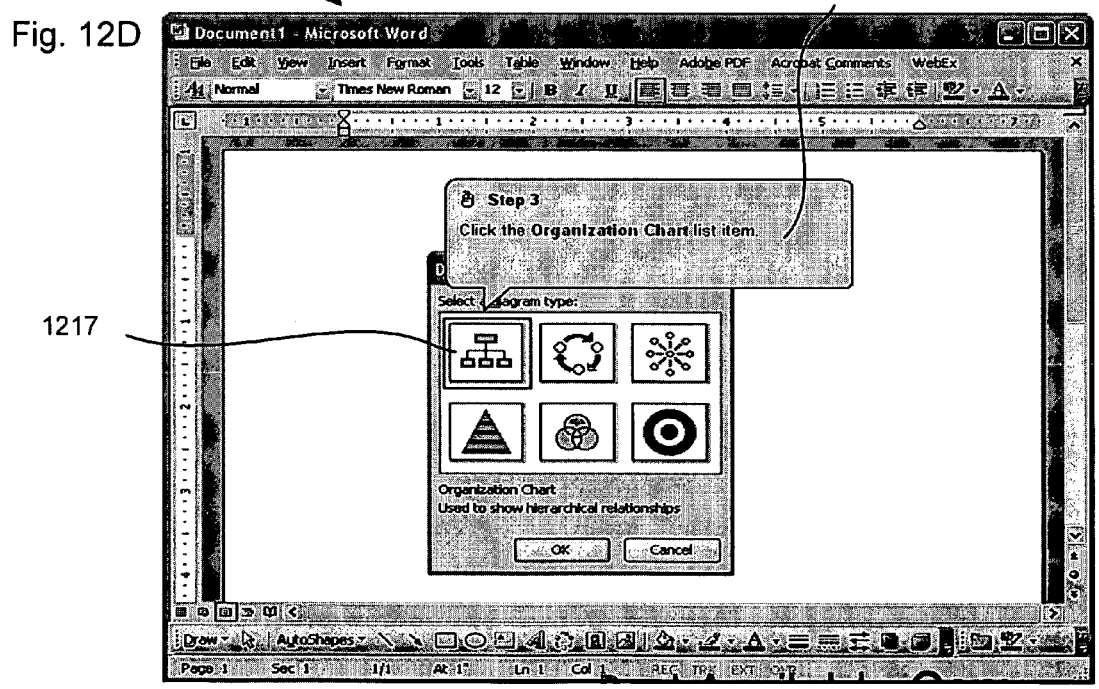

With reference to FIG. 12D, a screenshot 1200d of a third step of the task is illustrated. A third partial graphical overlay 1215 is positioned at a GUI object 1217 associated with an organizational chart, indicating to the user to select that GUI object 1217.

Figure 12E:
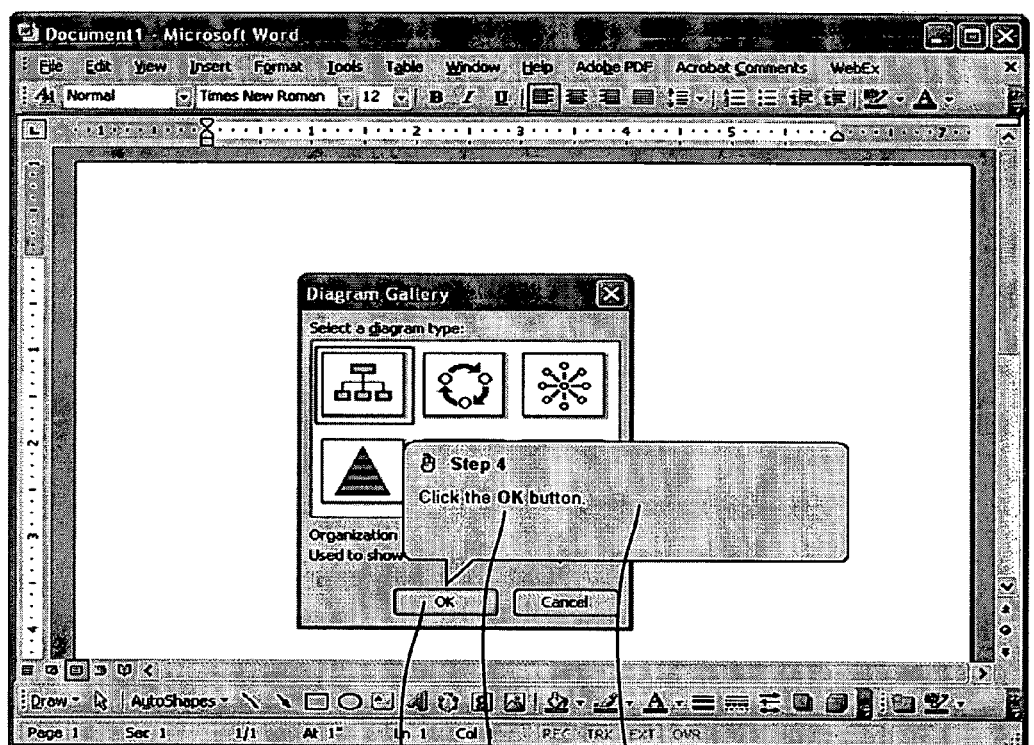

With reference to FIG. 12E, a screenshot 1200e of a fourth step of the task is illustrated. A fourth partial graphical overlay 1219 is positioned adjacent to a GUI object 1219 associated with the illustrated OK button, indicating to the user to select the button 1219 to complete the task of creating an organizational chart within the computer program 346.

In one embodiment, the entity map 345 (shown in FIG. 3A) and/or script 344 (shown in FIG. 3A) dynamically reference one or more GUI objects to determine the text 1219 to be displayed within a partial graphical overlay 1218 at the time the script 344 is executed. Such a procedure, provides a substantial advantage in that a single script 344 may be used to display text 1219 within the partial graphical overlay 1218 in the language (e.g., English, Spanish, or French) used by the computer program 346 (shown in FIG. 3A). Accordingly, a script 344 does not need to be rewritten to be used in connection with a computer program 346 using text 1219 in a language other than the language in which the script 344 was written.

Figure 13:
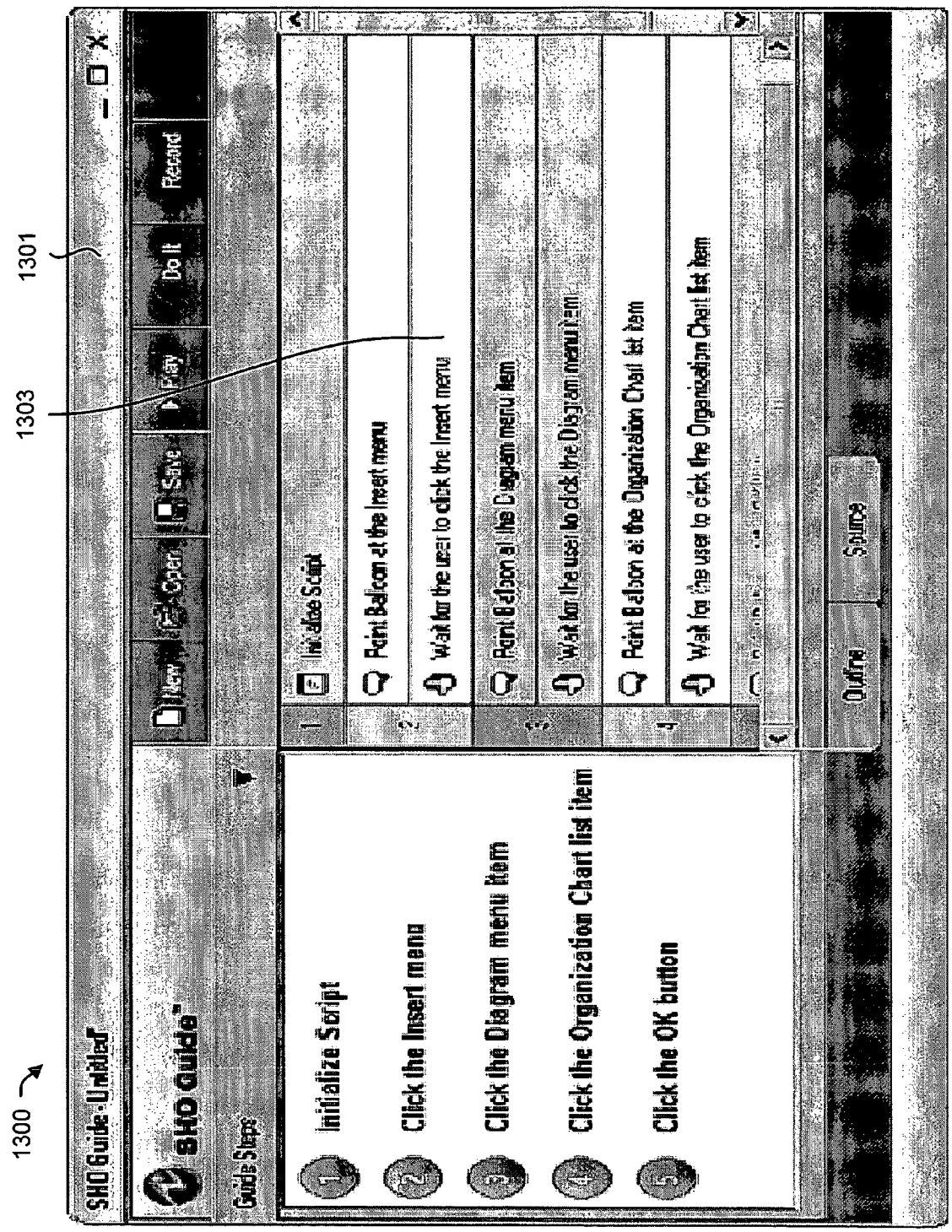
FIG. 13 is a screenshot illustrating one embodiment of captured steps of a script for performing a task within a computer program.

With reference to FIG. 13, there is shown a screenshot 1300 of a graphical user interface 1301 illustrating user output following recording of a script 344. In one embodiment, a script 344 may be formulated by performing the steps of the script 344 within a computer program 346 while a recording component of the present invention is active. The illustrated user output shows the steps of the script 344 created during such a recording process. More specifically, the user output illustrates the steps of the script 344 shown in FIGS. 12A-12E. As illustrated, the steps of the task are not performed by the script 344. Instead, the script 344 awaits correct user input before proceeding to the next step of the task, as shown, for example, by the script step 1303 "Wait for the user to click on the Insert menu."

Figure 14:
FIG. 14 is a screenshot illustrating one embodiment with video output provided to assist in teaching a user to perform a task within a computer program.

With reference to FIG. 14, there is shown a screenshot 1400 of video output 1401 used in connection with the execution of the script 344. The scripts 344 of the present invention are versatile and may include not only partial graphical overlays, but also video and audio output to aid the user in learning how to use a particular computer program 346 (shown in FIG. 3A). The versatility of the present invention makes it simple to create interactive content customized for a particular user or group of users.

Figure 15:
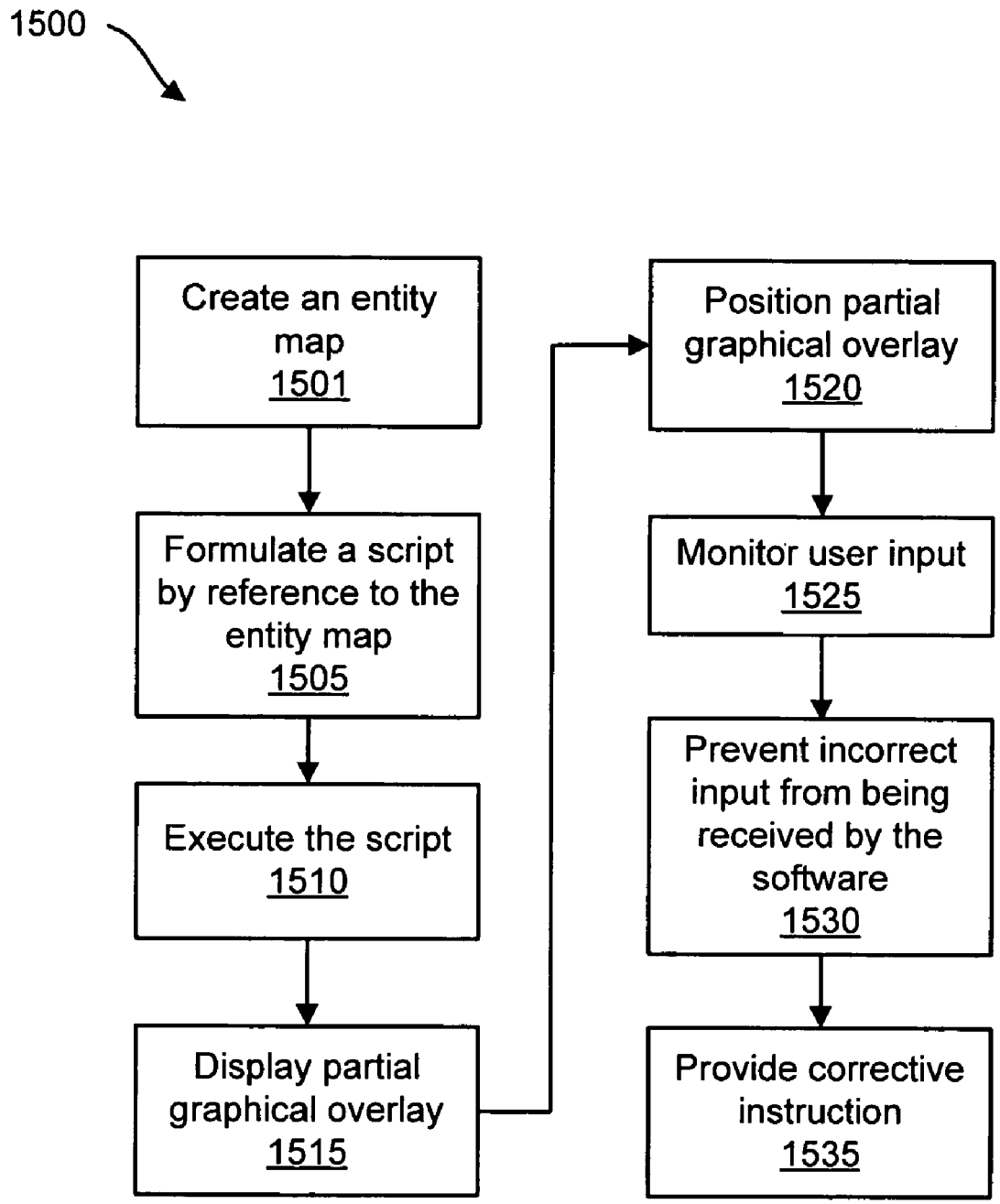
FIG. 15 is a flow diagram illustrating one embodiment of a method of teaching a user to perform a task within a computer system.

Referring now to FIG. 15, there is shown a flowchart 1500 illustrating one embodiment of a method for teaching a person to perform a task within a computer program 346. This method may be implemented in a number of different ways. For example, the method may be implemented using software that is distributed on a computer-readable medium, such as a compact disk or DVD. Software to implement this method may also be distributed in a hardcoded fashion, such as a portion of an embedded system or stored on a hard drive 114 together with a computer system.

An entity map 345 is created 1501. As noted above, the entity map includes programming instructions 347 for accessing a particular GUI object of a computer program 346. The entity map 345 may further include a name 349 associated with each programming instruction 347 for simplified access to a programming instruction 347. The entity map 345 may be created manually or automatically through analysis of GUI objects associated with a particular computer program 346 or using a combination of automated and manual procedures. The entity map 345 may be used both during formulation and execution of the script 344.

As noted above, the entity map 345 provides great flexibility in using the systems and methods disclosed herein. For example, in one embodiment, a script may be used on both an old version and a new version of a computer program 346 by referring the script 344 to an entity map 345 associated with the appropriate version of the computer program 346.

Next, a script 344 is formulated 1505 by reference to the entity map 345. During the formulation process, the entity map 345 may be used to determine how to access and locate a particular GUI object in order to perform a step of the task. Individual programming instructions 347, in one embodiment, may be incorporated directly (hardcoded) into the script 344 from the entity map 345. In alternative embodiments, the entity map 345 may be dynamically or statically referenced by a particular script 344. Dynamic referencing of the entity map 345 enables adaptation of the particular script 344 when the script 344 is executed to a new version of the computer program 346 by creation of an entity map 345 adapted to the new version of the computer program 346. In one embodiment, the script 344 may determine, at the time it is executed, which version of a computer program 346 is running and reference the appropriate entity map 345 to properly execute the script 344.

Following formulation of the script 344, the script 344 is executed 1510. The script 344 may be a distinct file from the entity map 345 or may be incorporated into the entity map 345. During execution of the script 344, as explained above, the script 344 indicates to a user how to perform a task within the computer program 346. This may be done by performing the task for the user, which may include partial graphical overlays (e.g., the partial graphical overlay 1201 shown in FIG. 12A) or other types of instructions, or by indicating to a user how to perform the task without performing the steps themselves. As indicated above, instructions 347 from the entity map 345 may be incorporated into the script 344 or, alternatively, the entity map 345 may be dynamically or statically referenced by the script 344.

During execution of the script 344, a partial graphical overlay is displayed 1515. The partial graphical overlay is displayed directly on top of an actual, non-simulated graphical user interface of the computer program 346. Each partial graphical overlay visually indicates to the user to provide input to cause the computer program 346 to perform a step of the task. In one embodiment, if the step is performed for the user, each partial graphical overlay will be displayed at a speed such that the user will have sufficient time to review partial graphical overlay displayed before the next step is performed. Alternatively, each partial graphical overlay will be displayed until the user performs the indicated step.

The partial graphical overlay may include text, graphics, animation, or video indicating to a user how to provide input to the associated graphical user interface object of the computer program 346. The partial graphical overlay obscures only a portion of the user interface of the computer program 346, such that the user may still view the pertinent graphical user interface object to which input must be directed to perform a step of the task.

Furthermore, during execution of the script 344, a partial graphical overlay is positioned 1520 adjacent to the associated graphical user interface object. This positioning occurs regardless of a position of the graphical user interface object without any modification to source code of the computer program 346. As indicated above, this may occur by querying the system 301 in use to determine a location of the graphical user interface object at run-time and then properly positioning the partial graphical overlay. As a result of this feature, the user may directly interact with the program itself regardless of the configuration of the GUI objects on the computer program 346. Thus, user customization of graphical user interface objects will not disrupt the performance of this method. Furthermore, because the user interacts with the computer program 346 in the configuration in which the user will perform the task, the user may more easily learn to perform the task, i.e., the user will not be confused by the differing position of GUI objects within the computer program 346.

User input during execution of the script 344 is optionally monitored 1525. This may be implemented using, for example, an input monitor 343, as explained in connection with FIG. 3A. The monitoring of user input may be useful to determine the skill level of a particular user.

In one embodiment, incorrect input is prevented 1530 from being received by the software 346. This may be achieved, for example, by using the method of filtering user input described in connection with FIG. 11.

In another embodiment, corrective instruction is provided 1535 to a user who submits incorrect user input during execution of the script 344. The corrective instruction may be embodied in a number of different ways, such as the corrective instruction 1208 shown in FIG. 12C, or by audio, video, or animation.

Figure 16:
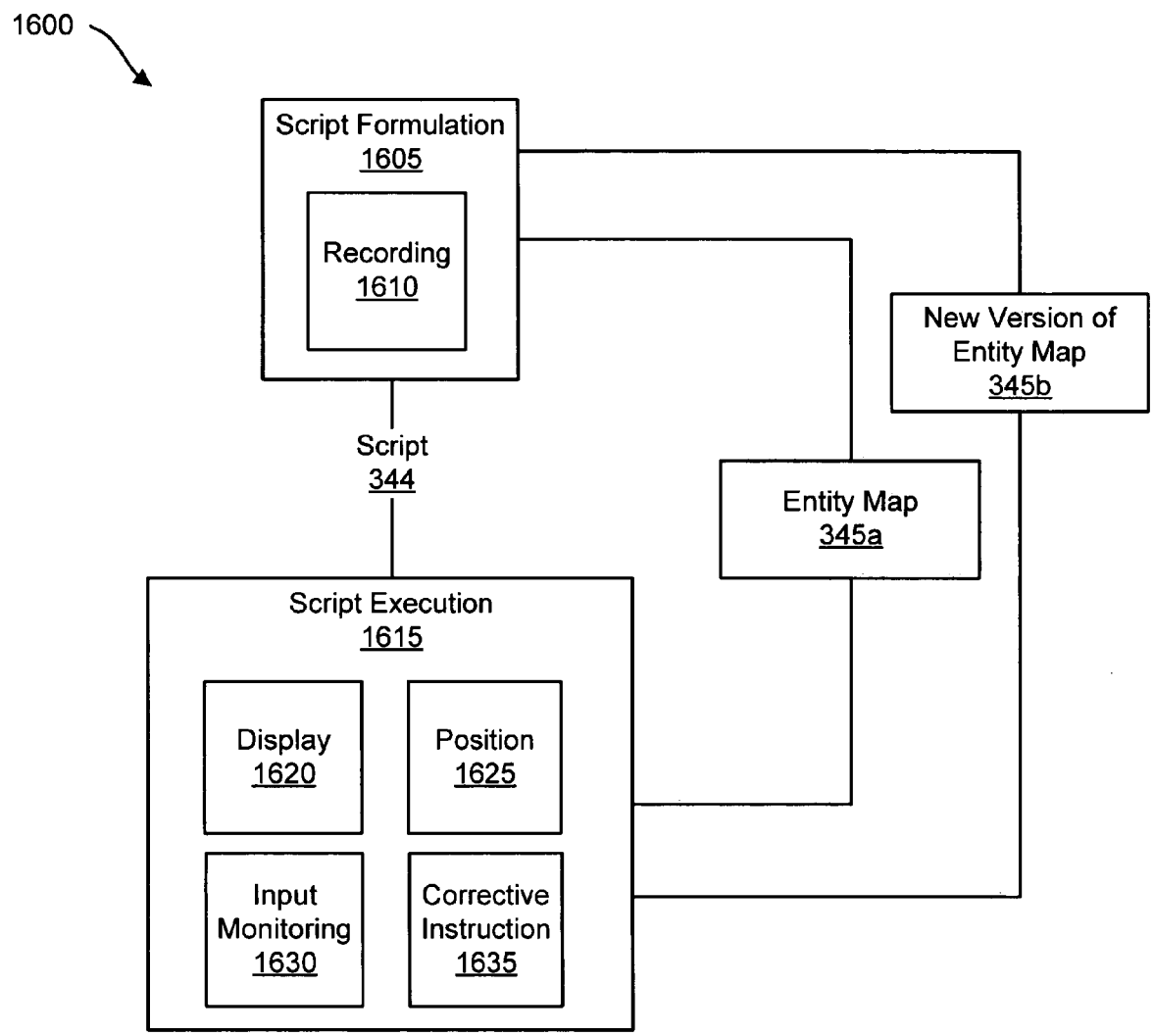
FIG. 16 is a logical block diagram illustrating one embodiment of a system of teaching a user to perform a task within a computer system.

FIG. 16 is a block diagram of logical components of a system 1600 for teaching a person how to perform the steps of a task within a computer program 346. The depicted logical components may be implemented using one or more of the physical components shown in FIGS. 1 and 3. Additionally, or in the alternative, various logical components may be implemented as software modules stored in the memory 112 and/or storage device 114 and executed by the CPU 110. Of course, the logical components may be implemented as a combination of both software and hardware. If implemented as software, each component may involve one or more discrete or commonly used software modules that may operate independently or in conjunction with other software or hardware components. The system 1600 does not necessarily involve a single software package, but may include multiple discrete software packages.

The system may include a script formulation component 1605 that formulates the script 344 by reference to an entity map 345*a*. As noted above, the entity map 345*a* includes programming instructions 347 for accessing GUI objects within the computer program 346. The script formulation component 1605 accesses the entity map 345*a* to determine which name 349 or programming instruction 347 to include or reference within the script 344 to access a particular GUI object within the computer program 346. The name 349 or programming instruction 347 may also be used within the script 344 to determine the location of a particular GUI object in order to perform a step of the task. As indicated previously, a new version of the entity map 345*b* may be used to run a script 344 on a new version of the computer software 346.

In one embodiment, a recording component 1610 is used by the script formulation component 1605 to formulate the script 344. While the recording component 1610 is active, user input directed to the computer program 346 is captured and recorded for later execution. Use of the recording component 1610 simplifies script formulation. Many different types of scripts 344 may be formulated with little or no knowledge of programming procedures of the computer program 346. Simply by performing the steps and recording them, the steps may be captured into a script 344 for subsequent execution. In one embodiment, the partial graphical overlays (e.g., the partial graphical overlay 1201 shown in FIG. 12A), including instructions within the overlays, are created automatically during the recording process.

Following formulation of the script 344, the script 344 may be executed by a script execution component 1615. The script execution component 1615 includes a display component 1620, a position component 1625, and optionally includes an input monitoring component 1630 and a corrective instruction component 1635.

During execution, the display component 1620 displays at least one partial graphical overlay directly on top of an actual, non-simulated graphical user interface of the computer program 346. Each partial graphical overlay visually indicates to the user to provide input to an associated graphical user interface object to cause the computer program 346 to perform a step of the task. The execution component 1615 may also, in one embodiment, perform the steps of the task for the user.

The position component 1625 positions a partial graphical overlay adjacent to the associated graphical user interface object regardless of the position of the graphical user interface object without any modification of the source code of the computer program 346. As noted above, this is a significant advantage because the systems and methods disclosed herein may be used in connection with any computer program 346 having graphical user interface objects and appropriate functions for accessing those objects, such as computer programs 346 that operate on Microsoft® Windows operating system.

In one embodiment, an input monitoring component 1630 may be used to monitor input received from the user. This component 1630 may comprise, for example, the input monitor 343 illustrated in FIG. 3A. The user input may be captured before it reaches the computer program 346 or even before the systems input queue 320 (shown in FIG. 3A). The input monitoring component 1630 may also filter or block incorrect user input as described in connection with the method of FIG. 12.

One embodiment of the present invention includes a corrective instruction component 1635. The corrective instruction component 1635 communicates with the input monitoring component 1630 to ascertain received user input. If the received user input is incorrect, the corrective instruction component 1635 may provide corrective instruction (e.g., the corrective instruction 1208 shown in FIG. 12C) to a user indicating the proper type of input that should be received.

As mentioned previously, the processes herein described could be mixed with known methods of displaying and relating multimedia objects. Such objects could include, but are not limited to, video, animation, sound, text, HTML, and images. By combining such multimedia objects with the interactive capabilities described herein, a software application could be created that could provide effective, interactive training for a software product without the expense and labor required by the current state of the art.

It is understood that the above-described arrangements are only illustrative of the application of the principles of the presently illustrated invention. The present invention may, however, be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, in addition to the above-described functions and abilities, the present invention may also be adapted for use in a variety of other applications. In one embodiment of the present invention, it is envisioned that its ability to interact with GUI objects could be used to test and verify the proper functionality of a software application before it is released to end-users. Another embodiment would allow the invention to automate tasks for disabled or handicapped users. A further possibility envisioned by this invention could be its use in providing technical and workflow support to software end-users through a variety of means, such as scripts provided to the user from a technical support provider or via the Internet through an automated support application.

As described above, the invention may operate in conjunction with an LMS/LCMS, the target application, via a browser or other application, or within its own process and memory space. This includes the invention or its content being delivered via the Internet, through the file system, or with a learning or help system.

Thus, while the present invention has been fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A computer-readable medium having computer-executable instructions for performing a method for teaching a person how to perform a task in a computer program with at least one graphical user interface object that performs a desired action in response to user input, the method comprising:

formulating a script, by reference to an entity map, that comprises step-by-step instructions indicating to a user of the computer program how to perform the task, wherein the entity map contains programming instructions for accessing at least one graphical user interface object of the computer program, wherein formulating the script comprises recording performance of steps of the task; and executing the script by:
displaying at least one partial graphical overlay directly on top of an actual, non-simulated graphical user interface of the computer program, each partial graphical overlay visually indicating input to be provided to an associated graphical user interface object to cause the computer program to perform one of the steps of the task; and
positioning the partial graphical overlay adjacent to the associated graphical user interface object regardless of a position of the graphical user interface object without any modification to source code of the computer program, wherein executing the script comprises a separate computing process from the computer program that interacts only with the graphical user interface object and an operating system on which the computer program is running.

2. The computer-readable medium of claim 1, wherein executing the script comprises dynamically referencing the entity map.

3. The computer-readable medium of claim 2, further comprising a new version of the entity map created for a new version of the computer program, wherein executing the script comprises referencing the new version of the entity map to properly execute in connection with the new version of the computer program.

4. The computer-readable medium of claim 1, wherein at least one programming instruction from the entity map is incorporated into the script.

5. The computer-readable medium of claim 1, wherein the method further comprises monitoring user input received during execution of the script.

6. The computer-readable medium of claim 5, wherein the method further comprises preventing incorrect user input from being received by the computer program.

7. The computer-readable medium of claim 5, wherein the method further comprises providing corrective instruction to a user in response to incorrect user input received during the execution of the script.

8. The computer-readable medium of claim 1, further comprising automatically creating programming code within the script configured to generate each partial graphical overlay in response to performing the steps of the task while recording performance of the steps of the task.

9. The computer-readable medium of claim 1, wherein execution of the script further comprises dynamically referencing a graphical user interface object to determine a language in which text within a partial graphical overlay will be displayed.

10. A computer-readable medium having computer-executable instructions for performing a method for teaching a person how to perform a task in a computer program with at least one graphical user interface object that performs a desired action in response to user input, the method comprising:

formulating a script, by reference to an entity map, that comprises step-by-step instructions indicating to a user of the computer program how to perform the task, wherein the entity map contains programming instructions for accessing at least one graphical user interface object of the computer program, wherein the script is formulated by recording performance of steps of the task; and wherein the script comprises a separate computing process from the computer program that interacts only with the graphical user interface object and an operating system on which the computer program is running and further comprises programming instructions configured to:
display at least one partial graphical overlay directly on top of an actual, non-simulated simulated graphical user interface of the computer program, each partial graphical overlay visually indicating input to be provided to an associated graphical user interface object to cause the computer program to perform one of the steps of the task; and position the partial graphical overlay adjacent to the associated graphical user interface object regardless of a position of the graphical user interface object without any modification to source code of the computer program.

11. The computer-readable medium of claim 10, wherein the script is configured to dynamically reference the entity map during execution of the script.

12. The computer-readable medium of claim 11, further comprising a new version of the entity map created for a new version of the computer program, wherein the script is configured to properly execute on the new version of the computer program by reference to the new version of new entity map.

13. The computer-readable medium of claim 10, wherein at least one programming instruction from the entity map is incorporated into the script.

14. A computer system for teaching a person how to perform a task in a computer program with at least one graphical user interface object that performs a desired action in response to user input, the system comprising:
- a processor;
- memory in communication with the processor; and
- instructions stored in the memory comprising:
  - an entity map containing programming instructions for accessing at least one graphical user interface object of the computer program;
  - a script formulation component that references the entity map and generates a script of step-by-step instructions indicating to a user of a computer program how to perform the task within the computer program; and
  - a recording component, wherein the script formulation component formulates the script by recording performance of steps of the task while the recording component is active; and
  - a script execution component that executes the script and comprises:
    - a display component that displays at least one partial graphical overlay directly on top of an actual, non-simulated graphical user interface of the computer program, each partial graphical overlay visually indicating input to be provided to an associated graphical user interface object to cause the computer program to perform one of the steps of the task; and
    - a position component that positions the partial graphical overlay adjacent to the associated graphical user interface object regardless of a position of the graphical user interface object without any modification to source code of the computer program, wherein the script execution component comprises a separate computing process from the computer program that interacts only with the graphical user interface object and an operating system on which the computer program is running.

15. The system of claim 14, wherein the entity map is dynamically referenced by the script execution component while the script is executing.

16. The system of claim 14, further comprising an input monitoring component that monitors user input received during execution of the script.

17. The system of claim 16, further comprising a corrective instruction component that provides corrective instruction to a user in response to incorrect user input received during execution of the script.

18. The system of claim 14, wherein the script execution component is executed on a desktop computer.

19. The system of claim 14, wherein the script execution component is executed on a wireless phone.

20. The system of claim 14, wherein the script execution component is executed on a personal data assistant (PDA).

21. A method for teaching a person how to perform a task in a computer program with at least one graphical user interface object that performs a desired action in response to user input, the method comprising:
- formulating a script, by reference to an entity map, that comprises step-by-step instructions indicating to a user of the computer program how to perform the task, wherein the entity map contains programming instructions for accessing at least one graphical user interface object of the computer program, wherein formulating the script comprises recording performance of steps of the task; and
- executing the script by:
  - displaying at least one partial graphical overlay directly on top of an actual, non-simulated graphical user interface of the computer program, each partial graphical overlay visually indicating input to be provided to an associated graphical user interface object to cause the computer program to perform one of the steps of the task; and
  - positioning the partial graphical overlay adjacent to the associated graphical user interface object regardless of a position of the graphical user interface object without any modification to source code of the computer program_wherein executing the script comprises a separate computing process from the computer program that interacts only with the graphical user interface object and an operating system on which the computer program is running.

22. The method of claim 21, wherein executing the script comprises dynamically referencing the entity map.

23. The method of claim 22, further comprising a new version of the entity map created for a new version of the computer program, wherein executing the script comprises referencing the new version of the entity map to properly execute in connection with the new version of the computer program.

* * * * *